(12) United States Patent
Callaghan

(10) Patent No.: US 7,539,724 B1
(45) Date of Patent: May 26, 2009

(54) INSTANT MESSAGING FOR EVENT NOTIFICATION AND EXCHANGING DATA IN AN INDUSTRIAL CONTROLLER ENVIRONMENT

(75) Inventor: David Michael Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 820 days.

(21) Appl. No.: 10/298,366

(22) Filed: Nov. 18, 2002

Related U.S. Application Data

(63) Continuation-in-part of application No. 10/161,848, filed on Jun. 4, 2002.

(51) Int. Cl.
  *G06F 15/16* (2006.01)
  *G05B 15/02* (2006.01)
  *G06F 11/00* (2006.01)
(52) U.S. Cl. .................... 709/205; 700/9; 714/4
(58) Field of Classification Search .............. 709/205; 700/9; 714/4
See application file for complete search history.

(56) References Cited

U.S. PATENT DOCUMENTS

| | | | |
|---|---|---|---|
| 5,122,948 | A | 6/1992 | Zapolin |
| 5,611,059 | A | 3/1997 | Benton et al. |
| 5,710,885 | A | 1/1998 | Bondi |
| 5,844,794 | A | 12/1998 | Keeley |
| 5,845,149 | A | 12/1998 | Husted et al. |
| 5,978,568 | A | 11/1999 | Abraham et al. |
| 6,199,068 | B1 | 3/2001 | Carpenter |
| 6,279,113 | B1 | 8/2001 | Vaidya |
| 6,324,607 | B1 | 11/2001 | Korowitz et al. |
| 6,381,502 | B1 | 4/2002 | Rudder et al. |
| 6,400,996 | B1 | 6/2002 | Hoffberg et al. |

(Continued)

FOREIGN PATENT DOCUMENTS

EP  03 02 6339  3/2004

(Continued)

OTHER PUBLICATIONS

Compuquest, Inc., SPM-IM-Instant Messaging Client for SpreadMsg Wireless Messaging Software, http://www.compuquestinc.com/spmim.html.

(Continued)

*Primary Examiner*—Douglas B Blair
(74) *Attorney, Agent, or Firm*—Turocy & Watson, LLP; R. Scott Speroff

(57) ABSTRACT

The present invention relates to systems and methods for distributing control information such as event notifications and status in a substantially real time manner. Such information can be provided in a parallel and concurrent manner to many locations/devices and/or users. In addition, multi-directional network communications are provided to facilitate system diagnosis, status, and troubleshooting among various parties and/or devices. In one aspect of the present invention, messaging components may be installed on local control components and remote diagnostic equipment that communicate across a network such as the Internet. If an event is detected, various parties can be contacted by the control components, wherein the parties may communicate in a concurrent manner while receiving control information from the control components. In this manner, diagnosis, troubleshooting, and/or routine maintenance can be performed collaboratively between various control components and remote systems/parties interacting therewith.

39 Claims, 19 Drawing Sheets

U.S. PATENT DOCUMENTS

| | | | |
|---|---|---|---|
| 6,412,032 B1 | 6/2002 | Neet et al. | |
| 6,457,024 B1 | 9/2002 | Felsentein et al. | |
| 6,463,338 B1 | 10/2002 | Neet | |
| 6,535,926 B1 | 3/2003 | Esker | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |
| 6,675,226 B1 | 1/2004 | Nair et al. | |
| 6,691,159 B1 * | 2/2004 | Grewal et al. | 709/219 |
| 6,708,074 B1 | 3/2004 | Chi et al. | |
| 6,714,974 B1 * | 3/2004 | Machida | 709/223 |
| 6,728,262 B1 | 4/2004 | Woram | |
| 6,732,165 B1 | 5/2004 | Jennings, III | |
| 6,732,191 B1 | 5/2004 | Baker et al. | |
| 6,801,920 B1 * | 10/2004 | Wischinski | 707/203 |
| 6,819,960 B1 * | 11/2004 | McKelvey et al. | 700/17 |
| 6,891,850 B1 | 5/2005 | Vandesteeg et al. | |
| 6,895,532 B2 * | 5/2005 | Raynham | 714/46 |
| 6,904,600 B1 | 6/2005 | James et al. | |
| 6,907,302 B2 * | 6/2005 | Karbassi | 700/65 |
| 6,965,802 B2 * | 11/2005 | Sexton | 700/83 |
| 6,970,913 B1 | 11/2005 | Albert et al. | |
| 6,982,953 B1 | 1/2006 | Swales | |
| 7,032,045 B2 | 4/2006 | Kostadinov | |
| 7,103,428 B2 | 9/2006 | Varone et al. | |
| 7,133,900 B1 * | 11/2006 | Szeto | 709/206 |
| 7,151,966 B1 * | 12/2006 | Baier et al. | 700/19 |
| 7,233,830 B1 * | 6/2007 | Callaghan et al. | 700/9 |
| 7,277,865 B1 | 10/2007 | Silverstone et al. | |
| 7,289,994 B2 * | 10/2007 | Nixon et al. | 707/10 |
| 7,310,344 B1 * | 12/2007 | Sue | 370/410 |
| 7,478,010 B2 * | 1/2009 | Hashemian | 702/151 |
| 2002/0004796 A1 | 1/2002 | Babula et al. | |
| 2002/0046239 A1 * | 4/2002 | Stawikowski et al. | 709/203 |
| 2002/0065898 A1 | 5/2002 | Leontiev et al. | |
| 2002/0068983 A1 * | 6/2002 | Sexton | 700/2 |
| 2002/0073236 A1 | 6/2002 | Helgeron et al. | |
| 2002/0107904 A1 * | 8/2002 | Talluri et al. | 709/202 |
| 2002/0156872 A1 | 10/2002 | Brown | |
| 2002/0156926 A1 | 10/2002 | Batka | |
| 2002/0161745 A1 | 10/2002 | Call | |
| 2003/0009253 A1 | 1/2003 | McIntyre et al. | |
| 2003/0009572 A1 | 1/2003 | Thurner | |
| 2003/0051074 A1 * | 3/2003 | Edwards | 710/1 |
| 2003/0208545 A1 * | 11/2003 | Eaton et al. | 709/206 |
| 2004/0214566 A1 * | 10/2004 | Suzuki et al. | 455/423 |
| 2004/0267729 A1 | 12/2004 | Swaminathan et al. | |
| 2005/0038528 A1 | 2/2005 | McKlvey et al. | |
| 2005/0055429 A1 | 3/2005 | Abele | |
| 2005/0080799 A1 | 4/2005 | Harnden et al. | |
| 2005/0125441 A1 | 6/2005 | Clemens et al. | |
| 2006/0173873 A1 | 8/2006 | Prompt et al. | |

FOREIGN PATENT DOCUMENTS

WO    WO 01 11586 A    2/2001

OTHER PUBLICATIONS

Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html.

International Business Machines Corporation, Cross platform instant messaging using web services, Research Disclosure, Kenneth Mason Publications, Hampshire, GB, vol. 458, No. 156, Jun. 2002.

W3C, Web Services Description Language, http://www.w3.org/TR/wsdl.

Vasudevan, A Web Services Primer, Apr. 4, 2001, XML.com, http://webservices.xml.com/pub/a/ws/2001/04/04/webservices/index.html.

* cited by examiner

INSTANT MESSAGING FOR EVENT NOTIFICATION AND EXCHANGING DATA IN AN INDUSTRIAL CONTROLLER ENVIRONMENT

REFERENCE TO RELATED APPLICATIONS

This application is a continuation-in-part of U.S. patent application Ser. No. 10/161,848 which was filed Jun. 4, 2002, entitled System and Methodology Providing Adaptive Interface in an Industrial Controller Environment.

TECHNICAL FIELD

The present invention relates generally to industrial control systems, and more particularly to a system and methodology to provide a real time and multi-party user interface for an industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet®, DeviceNet® or other network protocols (Foundation Fieldbus (H1 and Fast Ethernet) Modbus/TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

User Interfaces are often employed to interact with controllers when creating and downloading user programs. In addition, control processes are often monitored from the interfaces, wherein one or more of the controller variables may be adjusted by an operator during the control process. In many aspects however, these interfaces are somewhat inflexible to the controller environments supported and the features offered therein.

Currently, there are many proprietary communications formats for exchanging data with industrial control systems and associated embedded devices. These devices typically require custom software that is substantially inflexible in nature and is not easily supported by remote locations and/or devices. One attempt at providing communications to remote stations and users from a control environment has been via e-mail notification. As such, if an electronic notice is sent out from a controller station to a plurality of remote locations, the notice is generally delivered in a unidirectional manner whereby users may be notified in isolation from other users, and communications are generally limited to notifying users that a problem has occurred without affording the opportunity to gain further information from the controller, let alone other interested parties. If an e-mail were attempted in the form of a reply to the notice, the non-real time nature of the reply may lead to serious consequences if further problems develop in the control environment (e.g., delivery of an e-mail has an undetermined time of receipt from sender to receiver). Moreover, e-mail systems are generally hard-coded at the control end, wherein changes to such systems can involve considerable expense and design.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to enable multi-party/device communications (event or non-event driven) and to facilitate substantially real-time data transactions in a networked industrial controller environment. In one aspect, a standard messenger component can be adapted to an industrial controller and/or communications module associated therewith (also referred to as the modules). A remote system such as a computer, cellphone, pager or personal digital assistant, for example, also operates in accordance with a messenger service or component, wherein the controller and/or remote system can be adapted to exchange information in a client and/or server configuration, if desired.

If an event occurs such as a detected fault or diagnostic problem, the controller or communications module can establish a real time communications session such as in a chat room session, uni or bi-directional pager communications with the remote system. Thus, the controller could notify an operator of a pending problem or other status via messages or codes displayed or provided in the communications session. Since the communications session is bi-directional (multi-directional if other parties/devices involved), the operator can access controller information to perform further diagnosis or send commands such as a shut-down command, for example. In another aspect, remote systems or operators can establish a session with the controller in order to observe current operating status or other controller activities (e.g., establish chat session to observe factory productivity). As can be appreciated, multiple devices and/or parties can be brought into the communications session as desired to form higher-level communications and to facilitate group decision-making regarding the system.

The above approach provides many advantages over conventional systems as follows: Multi-level and real-time communications can be established between remote devices and control systems; Custom code is generally not required to be implemented on the remote systems or control systems; and If event notifications are delivered by the control system, users can establish bi-directional communications to further diagnose existing problems in a real time manner.

Other aspects of the present invention provide an adaptive user interface framework to facilitate various interactions with an industrial control system. The user interface can be adapted to operate across various platforms and devices that cooperate to perform industrial control. This includes adapting the interface to determined capabilities of the platforms such as determining what hardware or software resources are presently available on the platform and adapting, selecting, and/or adjusting interface capabilities according to the determined resources. In addition, interface features can be automatically and/or manually adjusted based upon activities or capabilities of an interface operator and in accordance with a plurality of configuration options. Other options can include adapting formats and protocols to the capabilities of the device or user operating the interface.

In one aspect of the present invention, the user interface can be performed in a local execution environment, a remote execution environment, or a combination thereof. In accordance with local operations, smart cards or smart plug-ins can be adapted to control or restrict access to the control system. Such aspects can include biometric devices such as fingerprint or voice recognition features for validating and authenticating users that desire controller access. Other local options include adapting wearable interface devices such as glasses or goggles to provide operator display that also can include voice capabilities such as a microphone to affect interface controls. In another aspect modifiable and configurable interfaces such as a browser can be provided, wherein instead of only providing users with a single, standard interface for controller access, configurations options are provided to enable users to select from a plurality of interface types and associated controls to modify a selected interface.

In yet another aspect, the user interface can be adapted as a remote web service or a combination of a local interface employing remote web services to support the local interface. For example, this can include employing such services as an alerting, event service and/or a messenger service that support other interface capabilities such as monitoring, adjusting and operating a control system (e.g., facilitate real time message transactions between interface users). Still other aspects include pushing content and/or controls from a remote system to further enhance interface capabilities at the local system (e.g., pushing JPEG interface display, Active X controls). Furthermore, in addition to providing a plurality of various interface types and controls, the present invention facilitates adapting interface capabilities to various protocols and formats for different types of devices that may operate the interface and remote systems attempting access thereto.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to systems and methods for distributing control information such as event notifications and status in a substantially real time manner. Such information can be provided in a parallel and concurrent manner to many locations/devices and/or users. In addition, multi-directional network communications are provided to facilitate system diagnosis, status, and troubleshooting among various parties and/or devices. In one aspect of the present invention, messaging components may be installed on local control components and remote diagnostic equipment that communicate across a network such as the Internet. If an event is detected, various parties can be contacted by the control components, wherein the parties may communicate in a concurrent manner while receiving control information from the control components. In this manner, diagnosis, troubleshooting, and/or routine maintenance can be performed collaboratively between various control components and remote systems/parties interacting therewith.

Another aspect of the present invention relates to a system and methodology providing adaptive user interface capabilities in an industrial control environment. A user interface is provided that can operate across various software and/or hardware platforms. The platforms can be adapted with smart devices and/or wearable devices to facilitate access to a control system and can be adapted as a remote web service and/or adapted to interact with the service. The user interface can be tuned or adjusted in accordance with device capabilities operating the interface (e.g., alter interface displays and controls depending on platform) and can be adjusted or modified according to various operator or administrative preferences.

It noted that as used in this application, terms such as "component," "control components/devices," "messenger component or service," and the like are intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server (or control related devices) can be components. One or more components may reside within a process and/or thread of execution and a component may be localized on one computer and/or distributed between two or more computers or control devices. In another example, a messenger component can be a process executable on a computer or control device to process PLC interactions in accordance with an application that interfaces to a PLC that may alter one or more characteristics of PLC operations.

Figure 1:
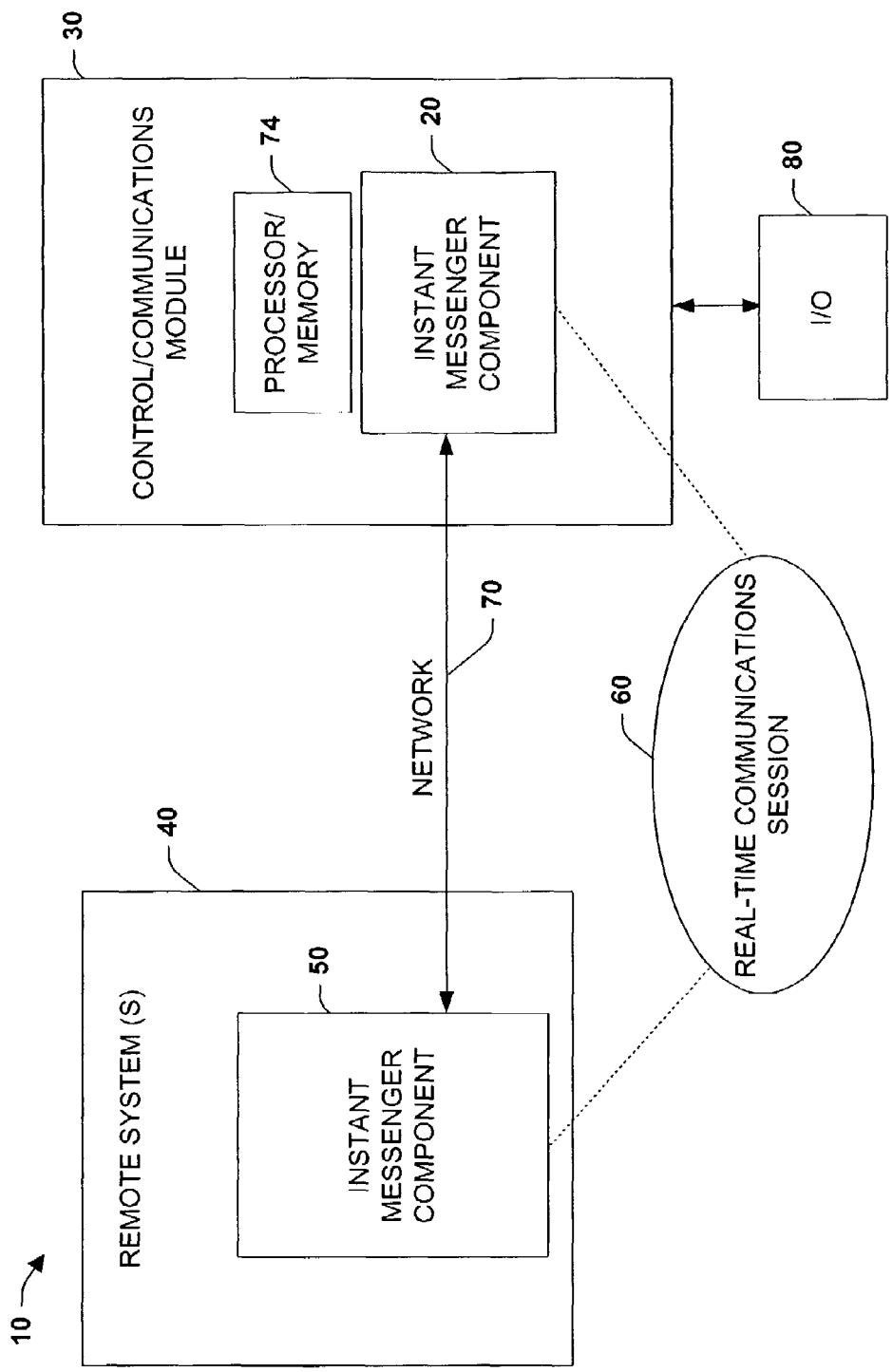
FIG. 1 is a schematic block diagram illustrating an industrial control system and message components in accordance with an aspect of the present invention.

The present invention relates to a system and methodology to enable multi-party/device communications (event or non-event driven) and to facilitate substantially real-time data transactions in a networked industrial controller environment. Referring initially to FIG. 1, a system 10 illustrates an industrial control system and message components in accordance with an aspect of the present invention. A standard Instant Messenger component 20 (e.g., MSN Messenger, web service providing multi-entity communications capabilities) can be adapted to an industrial controller and/or communications module 30 associated therewith (also referred to as the modules). A remote system 40 such as a computer, work station, laptop, hand held device, and/or personal digital assistant also operates in accordance with an Instant Messenger service or component 50, wherein the modules 30 and/or remote system 40 can be adapted to exchange information in a client and/or server configuration, if desired. If an event occurs such as a detected fault or diagnostic problem (can also include user or system initiated communications described below), the controller or communications module 30 can establish a real time communications session 60 such as in a chat room session with the remote system 40. Thus, the modules 30 could notify an operator of a pending problem or other status via messages or codes displayed or provided in the communications session 60. Since the communications session 60 is bi-directional (multi-directional if other parties/devices involved), the operator can access controller information to perform further diagnosis or send commands such as a shut-down command, for example, or initiate further procedures such as troubleshooting and/or corrective actions.

In another aspect, remote systems and/or operators can establish the communications session 60 with the modules 30 in order to observe current operating status or other controller activities (e.g., establish chat session to observe factory productivity). As can be appreciated, multiple devices and/or parties can be brought into the communications session 60 as desired to form higher-level communications and to facilitate group decision-making regarding the system 10.

It is noted that modules 30 can communicate to one or more remote systems 40 across a local factory network (e.g., DeviceNet, ControlNet, Ethernet/IP, DH+, Intranet) and/or a public network 70 such as TCP/IP or the Internet. This can also include other communications options such as phone connections and/or wireless interactions. A processor 74 (or processors) in the modules 30 executes from an associated memory subsystem that can include an operating system (e.g., Microsoft® Windows® NT/2000/XP, Windows CE, Linux, .NET, OS-9, UNIX, VRTX, QNX, VxWorks, CE.NET, custom-designed). The modules 30 can also communicate to and control various Input/Output subsystems 80 (I/O) and/or other networks (e.g., Analog, Digital, Programmed/Intelligent I/O modules, other programmable controllers, communications modules, networks). It is to be appreciated that the I/O subsystems 80 can also be similarly adapted for message communications as the modules 30 and therefore participate in the communications session 60. In another aspect, the I/O subsystems 80 may participate in the communications session 60 in an indirect manner through the modules 30.

Figure 2:
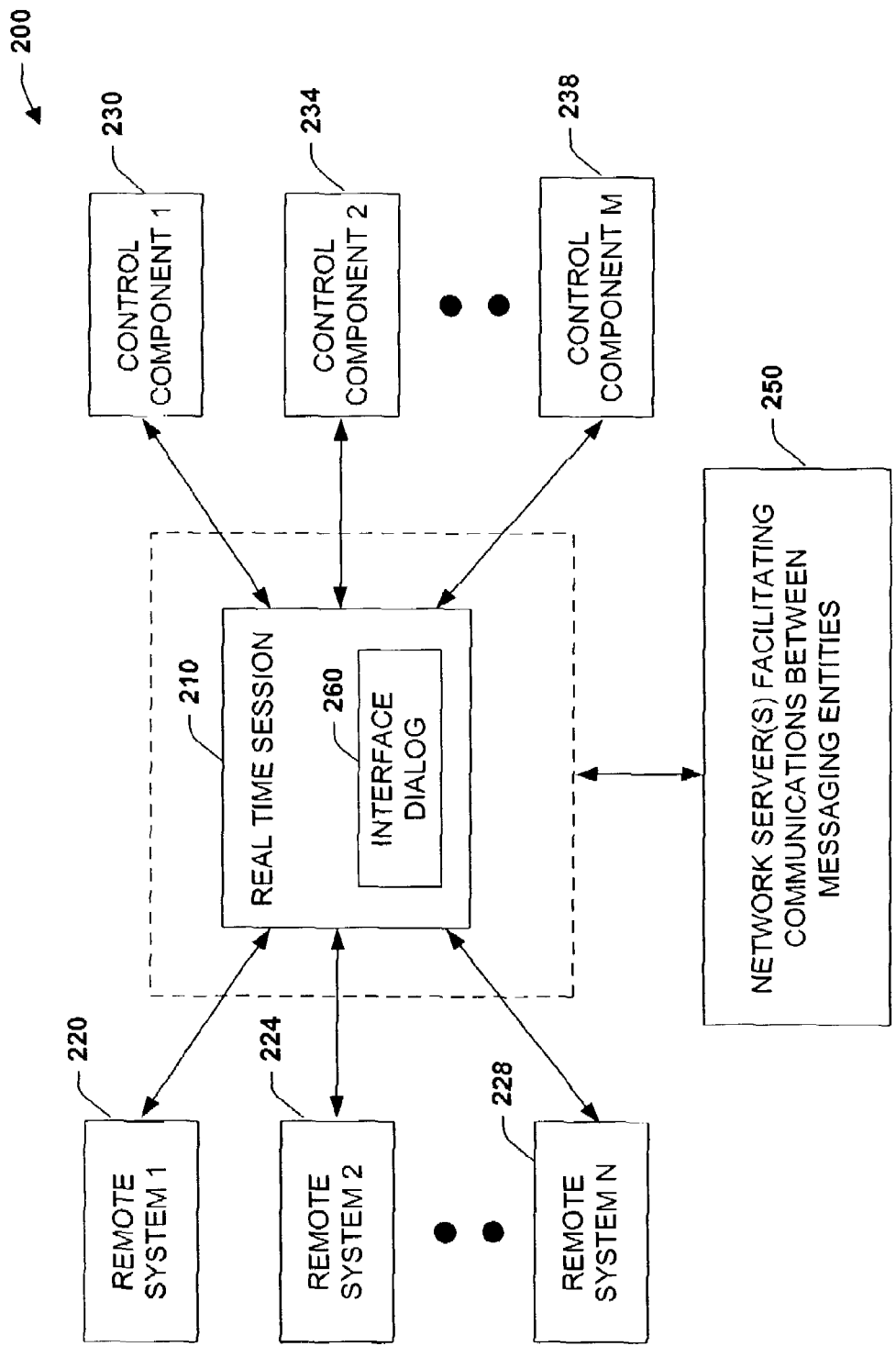
FIG. 2 is a schematic block diagram illustrating a real time message session in accordance with an aspect of the present invention.

Referring now to FIG. 2, a system 200 illustrates a real time message session 210 in accordance with an aspect of the present invention. One or more remote systems 220-228 participate in the real time message session 210 with one or more control components 230-238 adapted in accordance with the present invention. The control components 230-238 can include programmable logic controllers (PLC), communications modules, intelligent modules, network modules, I/O modules, software modules, web services and the like. A network server 250 (or servers) facilitates communications between the remote systems 220-228 and the control components 230-238. For example, respective entities illustrated in the system 200 are adapted with a message component (not shown) for initiating and/or participating in the real time session 210 (also referred to as the session 210). It is noted that the session 210 may be supported by one or more of the following standards: an RFC 1459 Internet Relay Chat Protocol, an RFC 2810 Internet Relay Chat Architecture, an RFC 2811 Internet Relay Chat: Channel Management, an RFC 2812 Internet Relay Chat: Client Protocol, and an RFC 2813 Internet Relay Chat: Server Protocol.

The network server 250 receives a request to establish the session 210 from one or more of the entities, and drives an interface dialog 260 to the entity making the request. The network server 250 then contacts or notifies one or more other entities that have been requested (components/systems 220-238) to establish the session 210. It is noted that even though an entity may not have responded to a request, that the interface dialog 260 may still be presented to the requesting party, wherein information can be provided to or exchanged with the interface dialog 260 for future reference employable by a non-responding or late-responding party. When the session 210 has been established, respective entities are provided with the interface dialog 260 in order to exchange information therein in a substantially real time manner. Such information can include automated information driven from the respective systems 220-228 and/or control components 230-238, and/or can include user/system-driven information such as an exchange of type-written messages, voice encoded messages, diagrams, video clips or video data, pictures, sounds, symbols, icons, emoticons, reports, files, procedures, manuals, hypertext links, web information, factory information, status data, control data, configuration data, mathematical data, program data, and/or substantially any information, data, data type, and/or format. It is also noted that any of the entities 220-238 may initiate and/or participate in the session 260.

Figure 3:
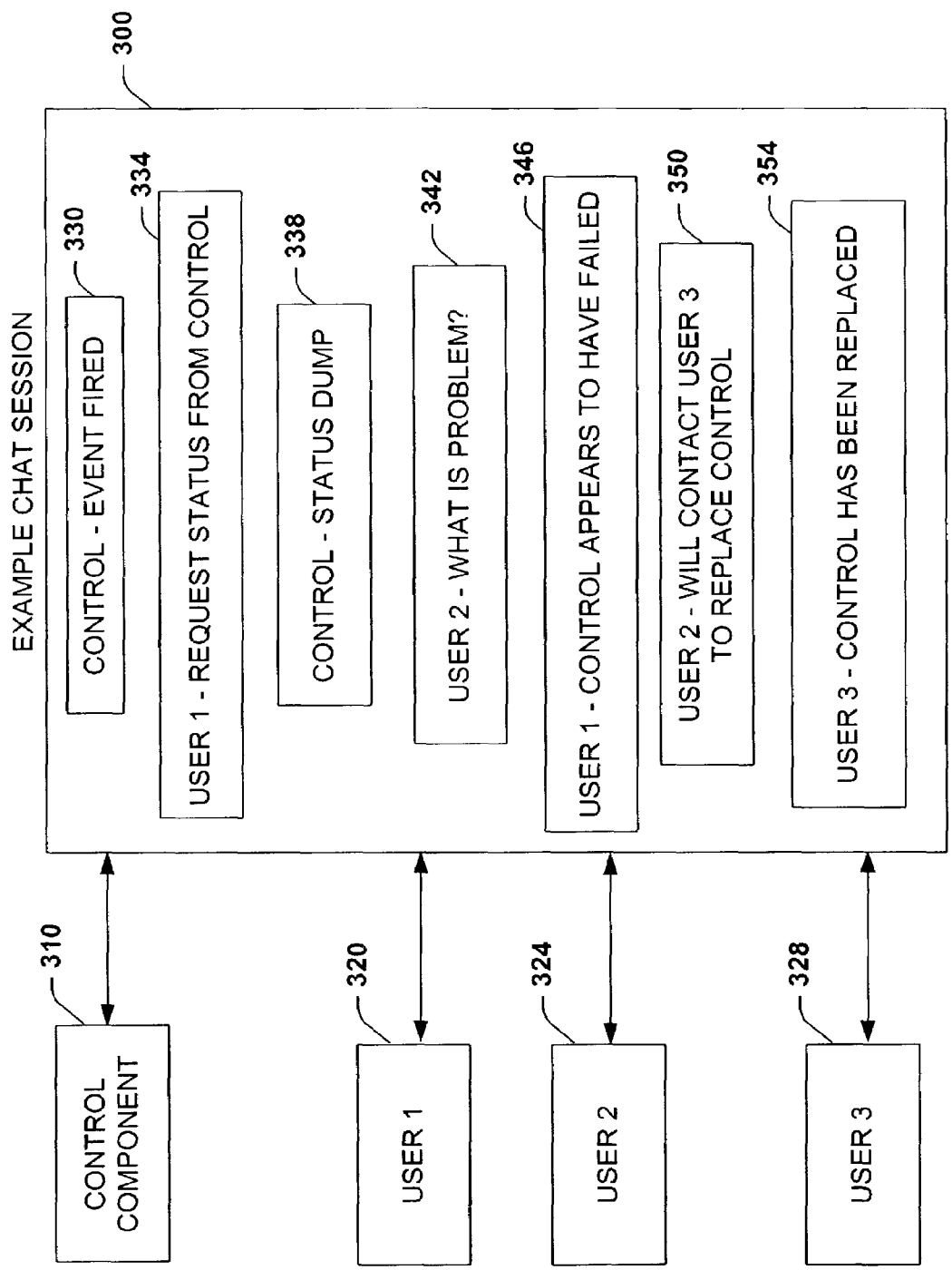
FIG. 3 is a diagram illustrating an example chat session in accordance with an aspect of the present invention.

Turning now to FIG. 3, an example chat session 300 is illustrated in accordance with an aspect of the present invention. It is to be appreciated that the chat session 300 is exemplary in nature and is not intended to limit the scope of the present invention to the particular aspects depicted. In this example, a control component 310 initiates the chat session 310 with a least one of a first user 320, a second user 324 and a third user 328. It is noted that the users 320-328 can also be represented as an entity such as a remote system or computer that communicates to the control component 310 without interaction from the user and is described in more detail below. Furthermore, the party or entity initiating the chat session 300 can contact one or more other parties, if desired, and/or one or more of the parties participating in the chat session 300 can contact additional parties if desired and bring those additional parties into the chat session.

Initially, an event is detected in the control component 310 causing the chat session 300 to be initiated with at least one of the users 320-328. At 330, the control component 310 sends a message that an event has fired. At 334, the first user 320 requests status from the control component 310 (e.g., code transmitted causing control to send status to chat session). At 334, the control component 310 provides a status dump to the chat session 300. At 342, the second user 324 joins the chat session 300 and asks, "What is the problem?" At 346, the first user 320, responds with a message that "The control appears to have failed." At 350, the second user 324 indicates that they will contact the third user 328 to replace the control component 310 (or component associated therewith). At 354, the third user sends a message that the control component 310 has been replaced. As noted above, all of the entities 310-328 can be provided with an interface dialog that displays (or provides data from) the chat session 300 and receives input therefrom.

Figure 4:
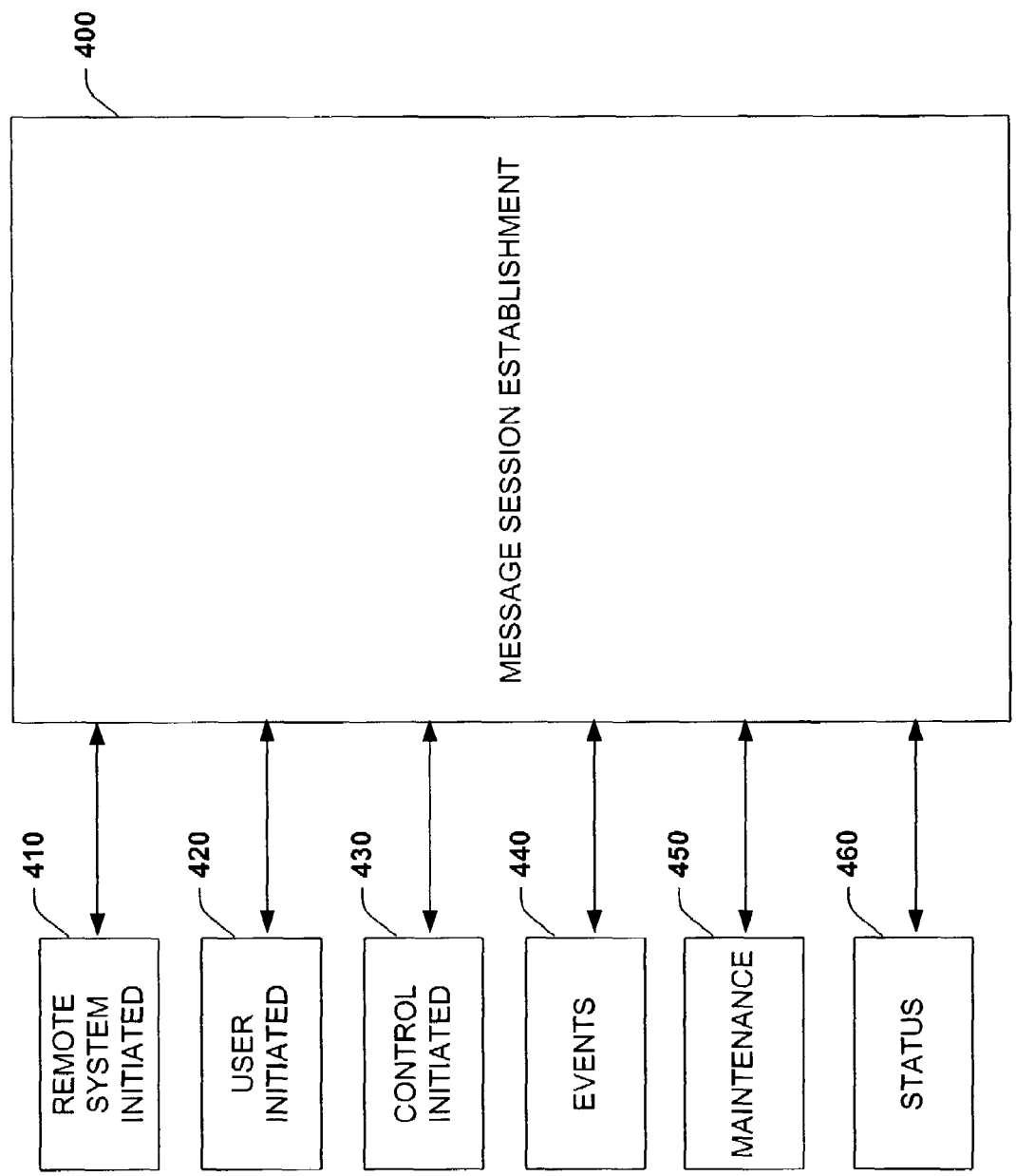
FIG. 4 is a diagram illustrating session establishment in accordance with an aspect of the present invention.

Referring to FIG. 4, a message session establishment process 400 is illustrated in accordance with an aspect of the present invention. The message session establishment process can be established in a variety of different forms. For example, remote systems 410 can automatically initiate the session 400 (e.g., supervisory system initiating session based upon a detected failure in a control component). At 420, users can initiate sessions between various entities as noted above. At 430, control components can initiate the session 400 in accordance with various entities—human and/or machine. At 440, one or more system events can cause a session to be initiated. Such events can fire within a control component and/or can be fired outside the control component. At 450, a maintenance activity can initiate the session 400. For example, a scheduled or periodic intervals (e.g., clock/calendar firing an event), various machines and/or users can be contacted via the session 400 to collaborate on system viability and/or perform one or more maintenance activities to facilitate consistent operation of an industrial control system. At 460, a user and/or remote system may establish the session 400 to acquire status from a control system or component as desired.

Figure 5:
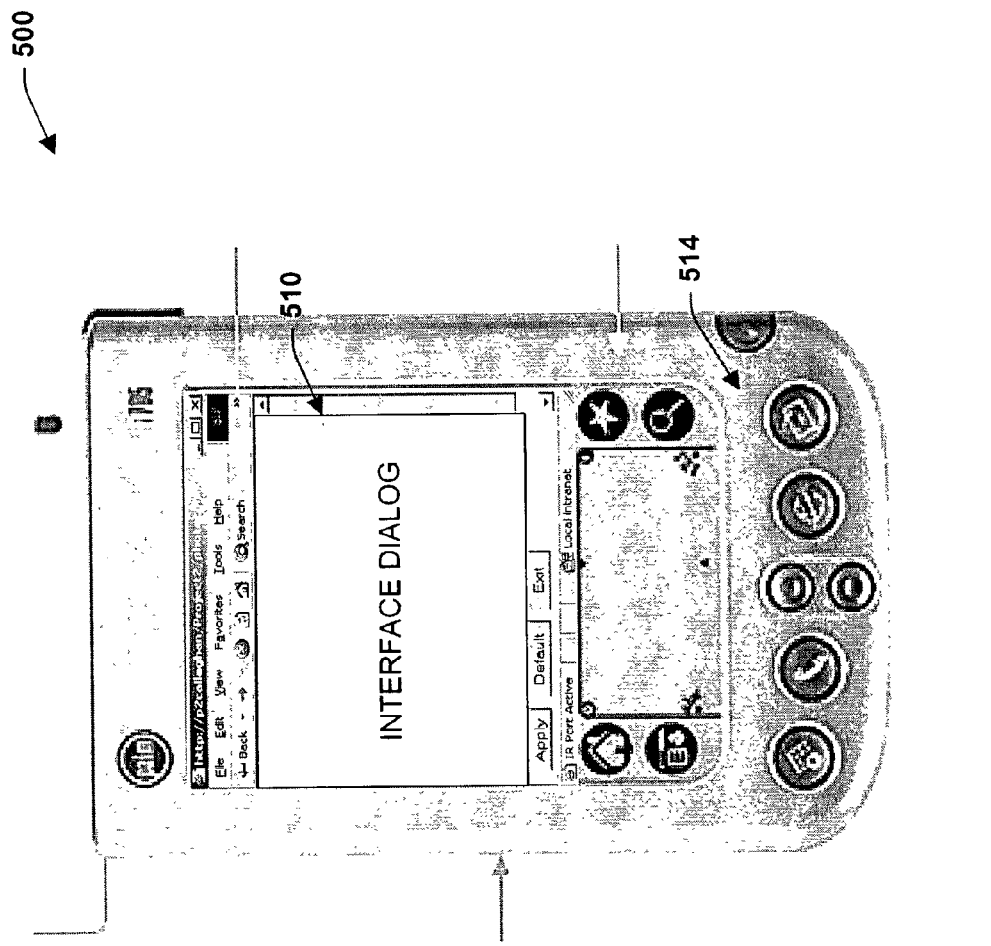
FIG. 5 is a diagram illustrating a hand held terminal in accordance with an aspect of the present invention.

FIG. 5 is a diagram illustrating a hand held terminal 500 in accordance with an aspect of the present invention. The hand held terminal 500 includes a display 510 for displaying status, receiving messages, and/or other options associated with the various components described above. The display 510 in the simplest example will provide a command type prompt to exchange messages via the instant messaging protocol. The display 510 can include one or more display objects reflecting various options and/or status indications which are described in more detail below. Such display options can include input boxes, sliders, icons, menus, buttons, selection options, tabs, pictures, colors, associated sounds, and so forth. As can be appreciated the hand held device 500 can include various buttons as illustrated at 514, inputs such as keyboards and/or a mouse, and include such aspects as voice recognition software and associated microphone for interacting with the display 510. Furthermore, the display 510 can be provided as a graphical user interface (GUI), wherein the GUI can be provided from a remote location such as from a remote browser from the Internet or from a local Intranet, if desired. Alternatively, the GUI can be driven from a local software component that has been previously stored and/or loaded in a remote interface device, for example.

Figure 6:
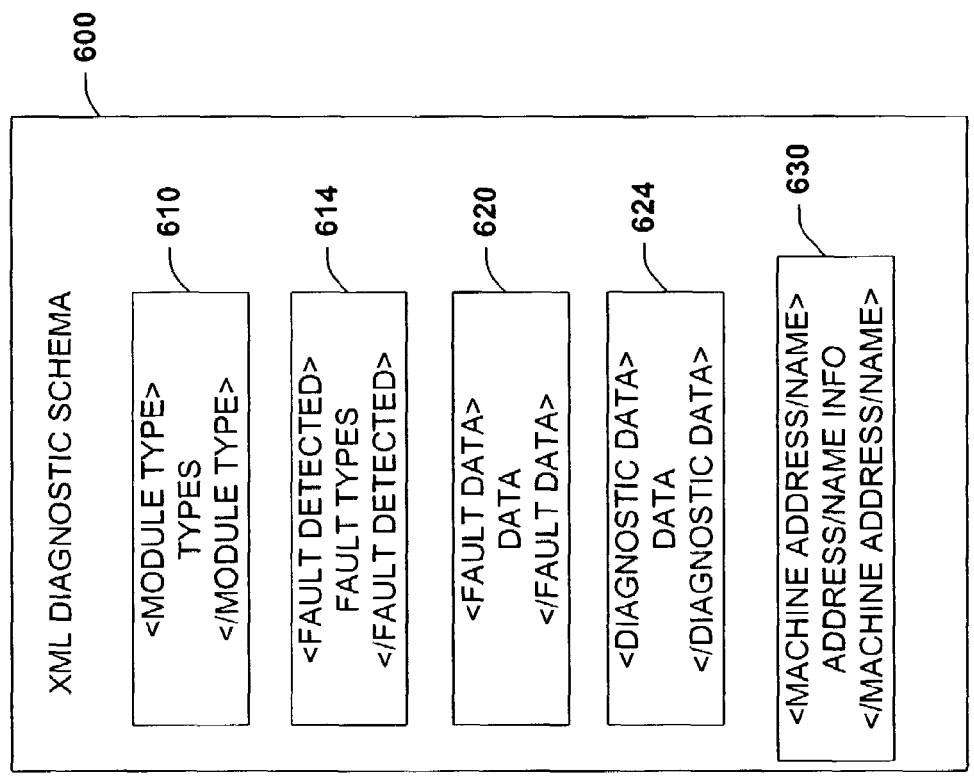
FIG. 6 is a diagram illustrating a diagnostic schema in accordance with an aspect of the present invention.
Figure 7:
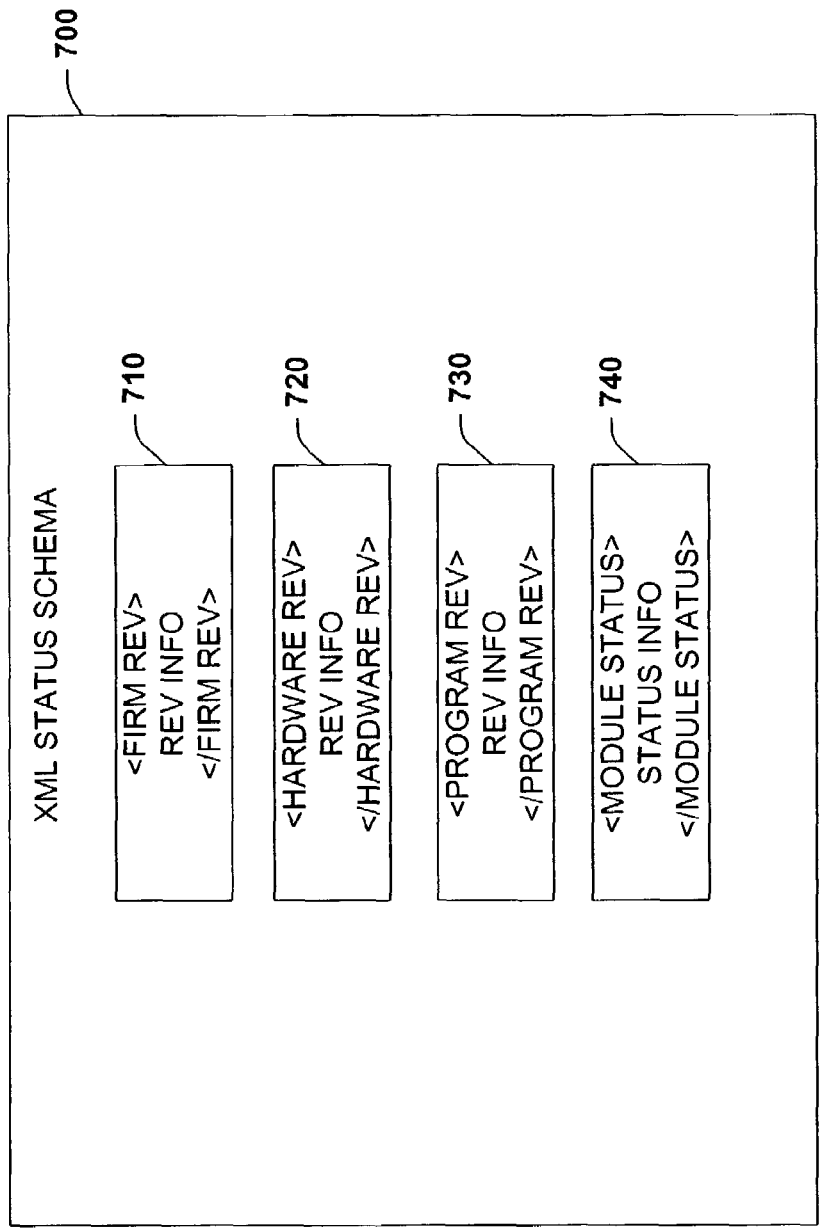
FIG. 7 is a diagram illustrating a status schema in accordance with an aspect of the present invention.
Figure 8:
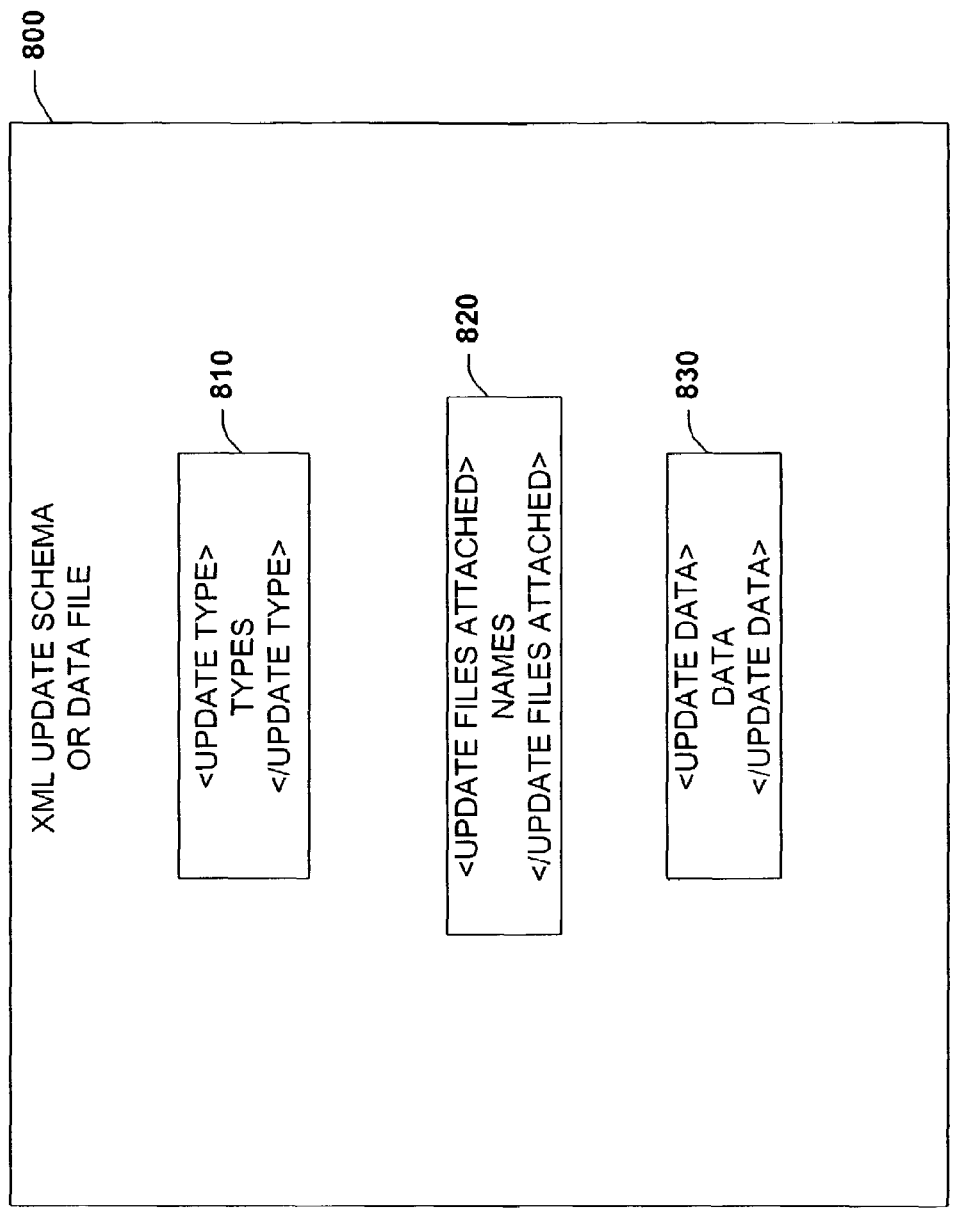
FIG. 8 is a diagram illustrating an update schema in accordance with an aspect of the present invention.

FIGS. 6-8 illustrate exemplary schemas that may be employed for communications in accordance with the present invention. Although the schemas represent one possible manner in which to transfer data to and from a message component and associated devices, it is to be appreciated that other possible data transfer mechanisms may be employed. For example, data can be transmitted in the form of binary or other type data packets that convey information in accordance with the present invention.

Referring now to FIG. 6, a diagram 600 illustrates a diagnostic schema in accordance with an aspect of the present invention. The diagnostic schema 600 includes one or more XML elements 610 through 630 (defined by starting and ending tags with (</> symbols), arranged in substantially any order) that relate to one or more diagnostic items and provide information to facilitate remote troubleshooting of a control component such as an I/O device or other module. Although not shown, the XML elements and associated tags can also include attribute information if desired, wherein an attribute is a name-value pair associated with an element start tag (e.g., <diagnostic type="non-critical event">).

At 610, a module type element is provided. This can include a plurality of types such as controller, communications module, input device, input sensor, output device, and so forth. At 614, a fault detected element can be provided that indicates one or more fault types that may have been determined in accordance with the module type (e.g., sensor failure, shorted output). At 620, a fault data element is provided. This can include various data types such as timers, counters, integers, floating points, and/or binary data relating to the detected fault and/or module, and include help or other type data to facilitate remote troubleshooting of the fault. At 624, diagnostic data can also be provided that relates to information concerning why a fault was detected or determined (e.g., status information relating to how fault was detected such as real time clock timed out, data relating to how an error was determined such as arithmetic overflow). At 630, machine address and/or name information can be provided to indicate a physical and/or network location for the respective module.

FIG. 7 is a diagram illustrating a status schema 700 in accordance with an aspect of the present invention. The status schema 700 can be generated and sent to remote systems in response to a remote request initiated by a message component or service and is employed to determine a general operating status of a control component. The status schema 700 can include firmware revision information for a control component at 710, a hardware revision at 720, and program revision information at 730, if any, —assuming an embedded program in the device. Revision information can be employed by remote systems and/or users to determine whether a firmware, hardware, and/or program update should occur at the control component. For example, if the latest firmware revision is (1.32) and the controller indicates the present firmware revision is (1.30), a firmware update can be initiated via the update schema described below.

At 740, module status information can be provided. This can include information relating to components or devices such as a serial number and/or other type identifier. Other status information 740 can include messages like "All components are operating within specifications" or "Analog values within specified ranges but, exhibiting one or more trends," for example. This information can also include encoded information such as diagnostic bits or words that describe one or more portions of the respective control component.

Referring to FIG. 8, a diagram 800 illustrates an update schema (also referred to as configuration schema) in accordance with an aspect of the present invention. At 810, an update type element specifies a proposed update for a control component. For example, this can include a firmware update, network address update, set output state, documentation update and so forth. At 820, an element specifies whether the proposed update specified at 810 is included in the XML schema 800 or is included as an attachment to the schema. For example, firmware revisions are generally transmitted in binary. Thus, the element 820 can indicate that one or more attached binaries follow the XML update schema 800. In another example, network address or desired output state can be specified in ASCII or other data format. Thus, an update data element 830 is provided that includes the updated information within the schema 800. It is noted that the schema 800 can support having actual updated information stored therein and support having one or more attachments (e.g., non-XML data transmitted subsequently to the update schema), if necessary.

Figure 9:
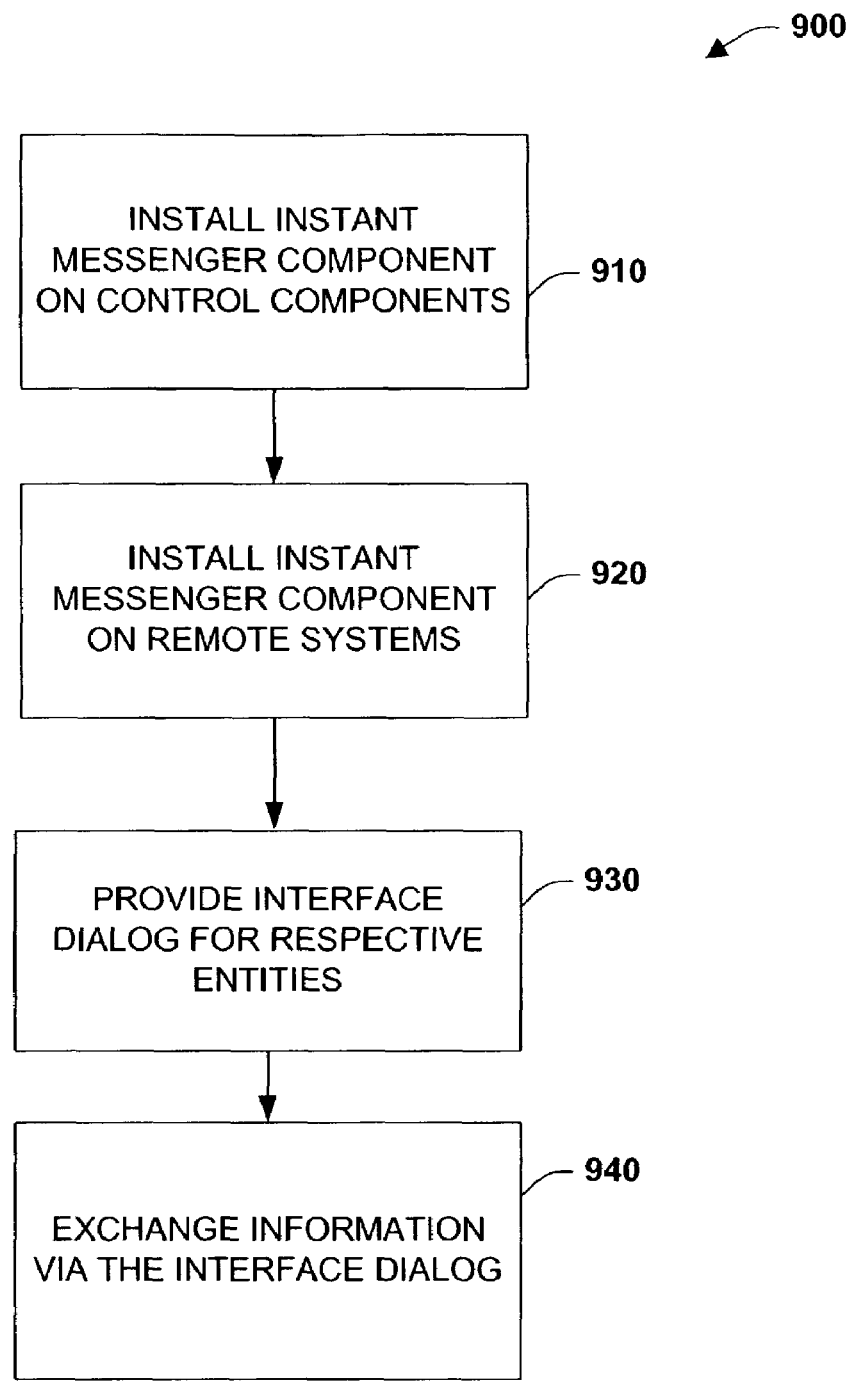
FIG. 9 is a flow diagram illustrating message communications in accordance with an aspect of the present invention.
Figure 16:
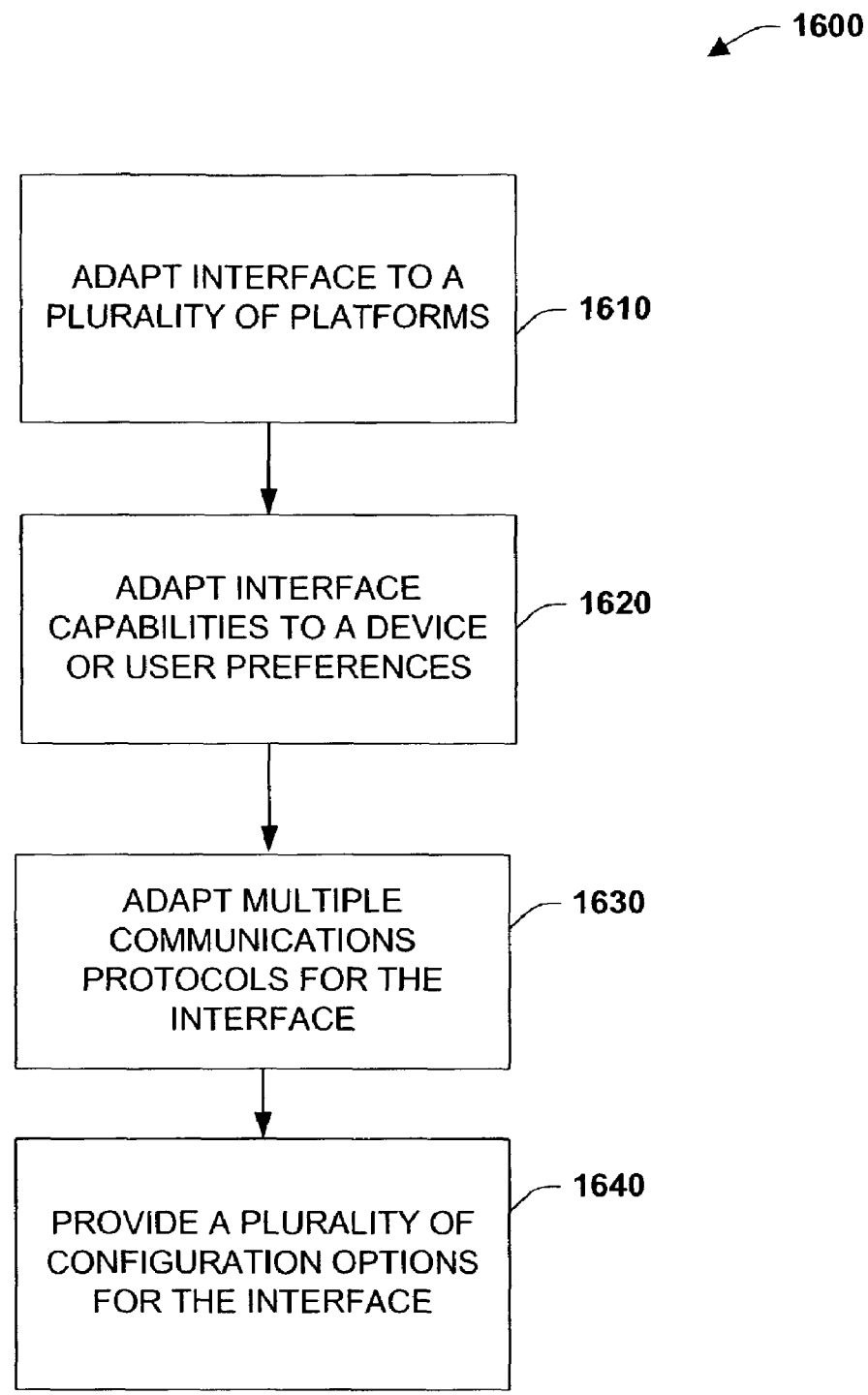
FIG. 16 is a flow diagram illustrating adaptive interfaces in accordance with the present invention.
Figure 17:
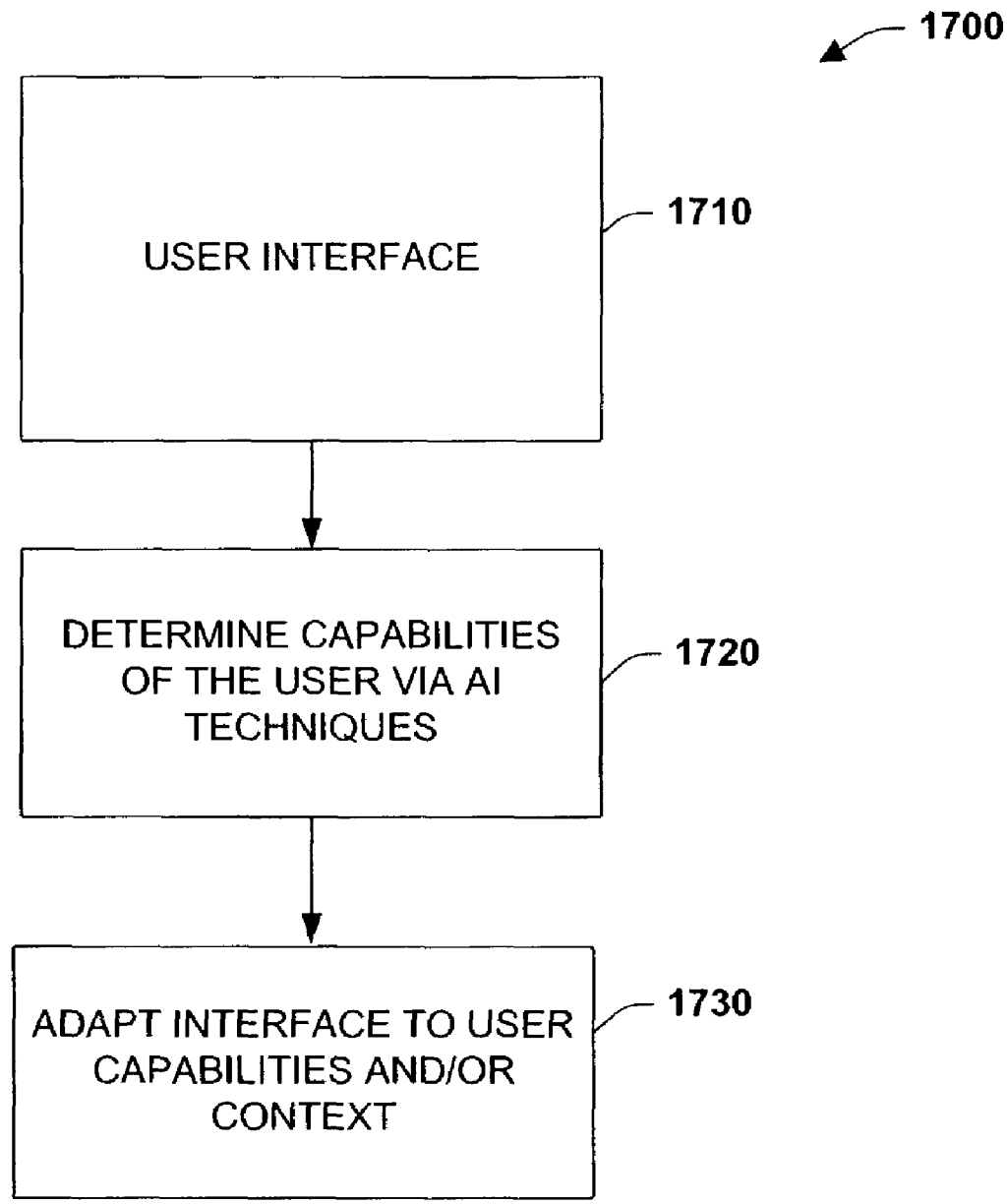
FIG. 17 is a flow diagram illustrating user-adapted interfaces in accordance with an aspect of the present invention.

FIGS. 9, 16 and 17 illustrate communication methodologies in accordance with an aspect the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 9 is a flow diagram 900 illustrating an aspect of instant messaging communications in accordance with the present invention. At 910, instant messenger components are installed on one or more control components such as a PLC, I/O module, and communications component, for example. Similarly, instant messenger components are installed on one or more remote network devices at 920, wherein such devices can include computers, hand held devices, laptops, phones, pagers, and substantially any remote device capable of communications with a network and having capabilities of running the messenger component. At 930, an interface dialog is provided for the respective communications entities described above in order to provide input and output capabilities for transmitting and receiving data between the respective entities. At 940, information is exchanged between control components and/or remote systems via the interface dialog, wherein such dialog can be provided in a chat session and/or other suitable interface to exchange data between entities.

Figure 10:
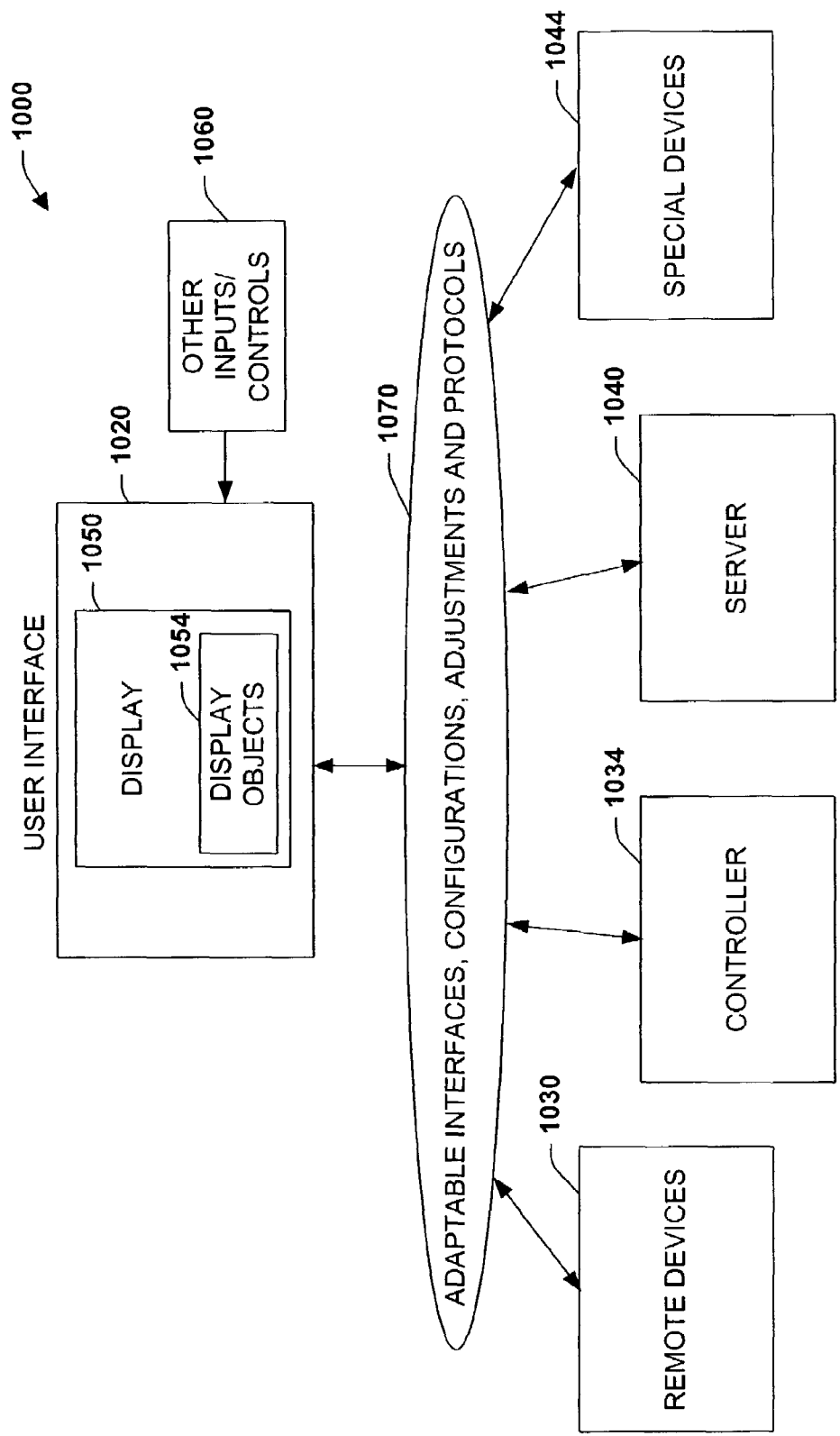
FIG. 10 is a schematic block diagram illustrating an industrial control system and interface component in accordance with an aspect of the present invention.

Referring to FIG. 10, a system 1000 illustrates an adaptable interface architecture and control system in accordance with an aspect of the present invention. The system 1000 includes a user interface 1020 that can adapt to, interact with and/or execute on various control platforms such as one or more remote devices 1030 (e.g., network cards, smart cards, I/O devices), controllers 1034 (e.g., Programmable Logic Controller (PLC)), network servers 1040, and/or special devices 1044 such as a wearable device for operating the interface 1020. The user interface 1020 can include a display 1050 having associated display objects 1054 for interacting with the user. For example, the display 1050 includes control system Human and Machine Interfaces (HMI) having graphical display (e.g., Graphical User Interface (GUI)) capabilities in order to provide feedback and output data to a user or system regarding various aspects of the system 1000 (e.g., providing status or view of control system or program/logic).

The display objects 1054 can include such aspects as configurable icons, buttons, sliders, input boxes, selection options, menus, tabs and so forth having multiple configurable dimensions, shapes, colors, text, data and sounds to facilitate operations with the system 1000. In addition, the user interface 1020 can also include a plurality of other inputs or controls 1060 for adjusting and configuring one or more aspects of the present invention. This can include receiving user commands from a mouse, keyboard, speech input, web site, remote web service and/or other device such as a camera or video input to affect or modify operations of the user interface 1020.

According to one aspect of the present invention, the user interface 1020 is adaptable to a plurality of various control applications and/or situations. Adaptability is illustrated at reference numeral 1070, wherein the user interface 1020 can be adapted to execute with or in conjunction with one or more of the platforms 1030 through 1044. This can include providing a plurality of interfaces at 1070 that are selectable by a user, and/or are adapted to capabilities of the platform. As one example, it may be determined that the remote device 1030 is capable of receiving voice commands and providing Liquid Crystal display outputs to the user. In this example, the user interface 1020 may then be provided to the user (e.g., pushed, downloaded, provided by remote web service) and adapted for receiving voice commands and driving the associated display type. In other words, the user interface 1020 is tailored to the capabilities of the device. In another example, it may be determined that a user is of a particular type. For example, a maintenance type user may desire to interact with different type interfaces (e.g., troubleshooting interfaces) and displays than a plant manager or other type user (e.g., productivity interfaces). In addition to tailoring the user interface to user/device capabilities at 1070, the present invention facilitates a plurality of modifiable and/or configurable interface options that are described in more detail below. Moreover, a plurality of various protocols may be adapted at 1070 for different platforms 1030-1044 to facilitate flexible operations and communications with the user interface 1020.

Figure 11:
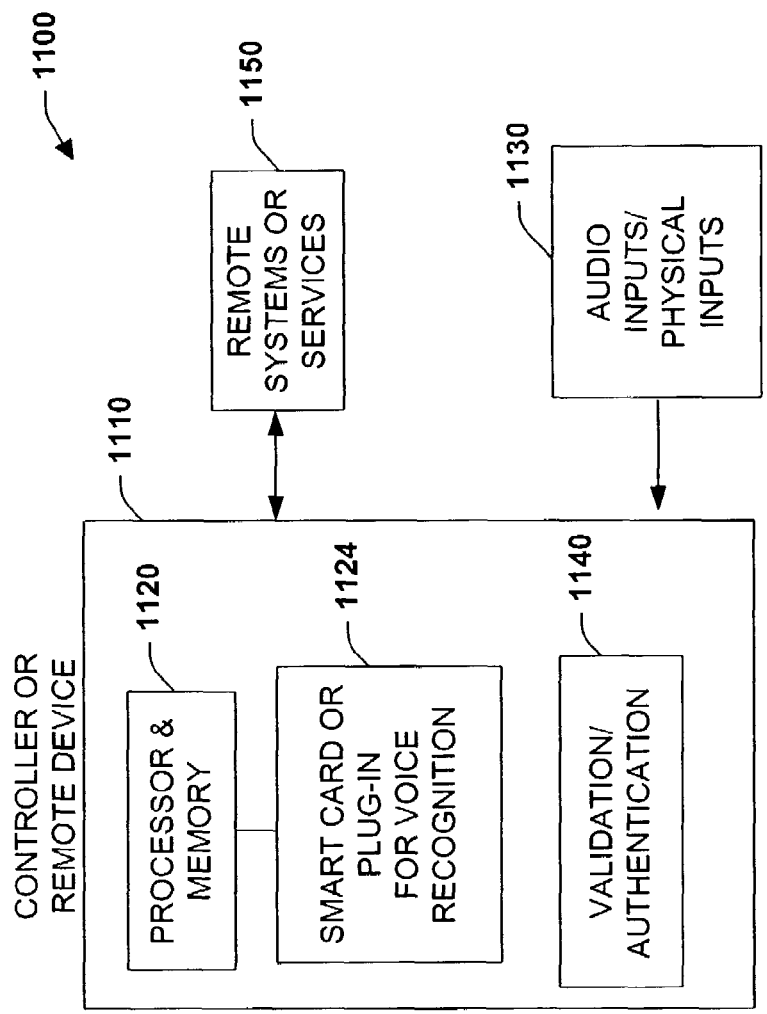
FIG. 11 is a schematic block diagram illustrating a voice-operated interface in accordance with an aspect of the present invention.

Referring now to FIG. 11, a system 1100 is adapted for voice operations in accordance with an aspect of the present invention. The system 1100 includes a controller or remote device/server 1110 having an associated processing and memory subsystem 1120 that can include an operating system (not shown). A smart card 1124, such as a commercially available bus card (e.g., PCI bus) and adapted for voice recognition, can be provided to analyze voice patterns from one or more audio inputs 1130 such as from a microphone or audio file transmitted via a network. The smart card 1124 can process predetermined voice patterns or codes (e.g., Hidden Markov Models) that are stored in the memory subsystem 1120, wherein the processing includes comparing the audio inputs 1130 with one or more stored audio patterns.

Audio pattern recognition can then enable voice activated validation and/or authentication procedures 1140 to occur before gaining access to the system 1100. As an example, a user may attempt to gain access to the controller 1110. Before user interface access is granted to the user, an authentication code or sequence may be performed via the components 1124 and 1140. The user may speak a predetermined pattern or code in the user's own voice, wherein the component 1124 digitizes the voice, and compares the digitized voice pattern with patterns stored in memory 1120 (or at remote web service). If the digitized voice compares suitably with a pattern previously stored, access can then be granted to the controller 1110. In another aspect, probabilistic analysis may be performed on the audio inputs 1130, wherein if spoken words are within a predetermined probability threshold for a user's voice, access can be granted (e.g., 75% likelihood spoken sequence belongs to user 1). It is to be appreciated that voice recognition can occur via software components as well as the smart card previously described. For example, a remote system, device, and/or service 1150 can load speech recognition software onto the controller 1110 via a network before speech processing activities occur in accordance with the validation and/or authentication procedures at 1140. It is to be appreciated that a plurality of other validation/authentication techniques and/or devices can be employed. For example, these techniques can include retinal scan, fingerprint recognition, and/or other distinguishing human characteristics and associated detectors/processors.

Figure 12:
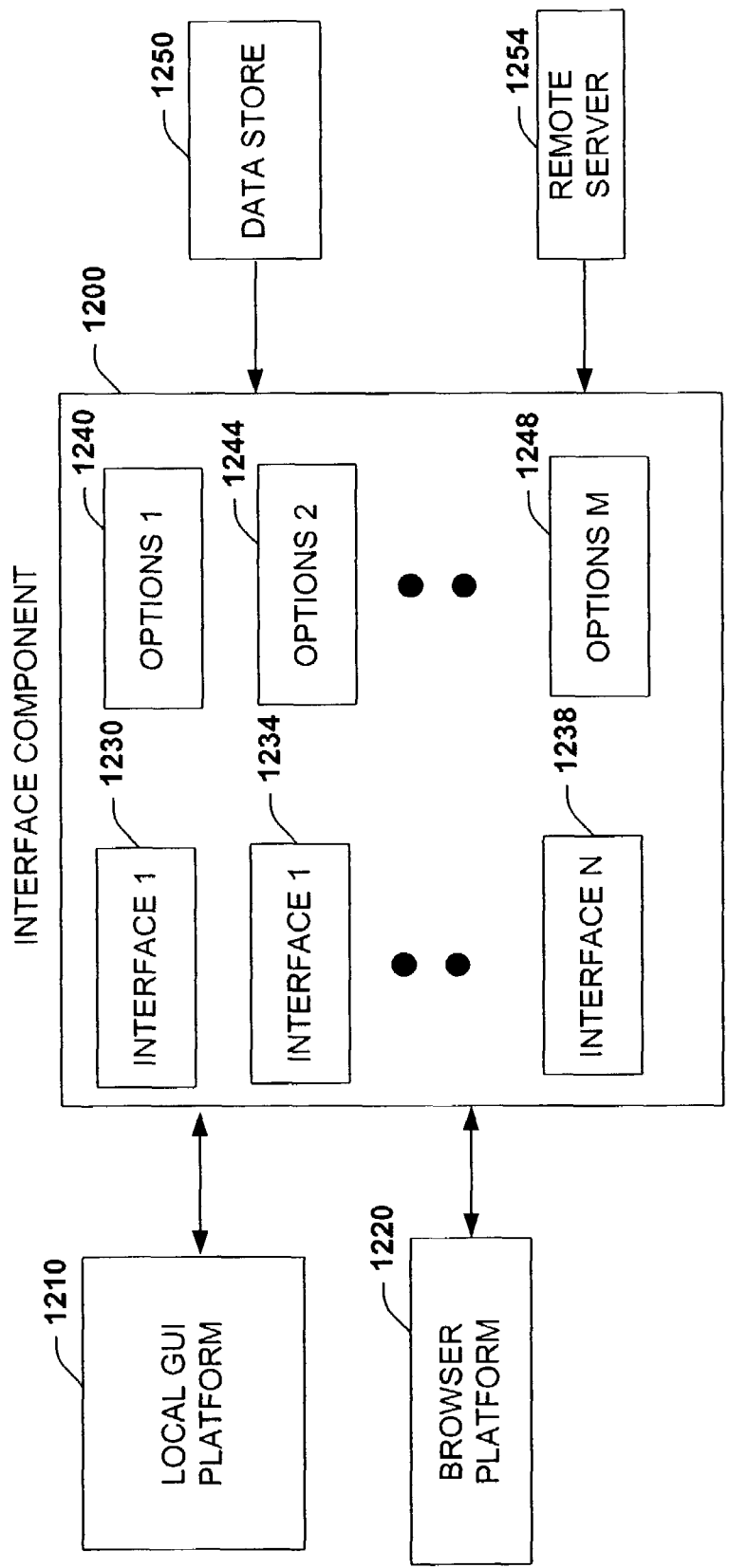
FIG. 12 is a schematic block diagram illustrating a modifiable and configurable interface in accordance with an aspect of the present invention.

Turning to FIG. 12, an interface component 1200 is illustrated in accordance with an aspect of the present invention. The interface component 1200 facilitates adapting a local interface or platform 1210 and/or a remote interface or platform 1220 with characteristics of a local and/or remote device or user environment. As an example, the local interface 1210 may be a computer connected to a controller and operating a GUI type interface, whereas the remote interface 1220 may be operated as a browser or web-type interface and interacting with a remote device such as a networked I/O card. The interface component 1220 includes a plurality of interface types 1230-1238 and interface options 1240-1248. The interface types and options can be served from a local data store 1250 and/or from a remote server, service, and/or web site at 1254.

In one aspect of the present invention, the interface types 1230-1238 are automatically determined and installed on the local 1210 or remote platforms 1220. The platforms can send a configuration code or sequence to the interface component 1200 indicating the capabilities of the platform. The code can indicate resources available such as a display type, memory capabilities, communications capabilities, module type, and input capabilities. Based on the code received, the interface component 1200, transmits an interface 1230-1238 (e.g., software to operate interface) having associated interface options 1240-1248 to the local or remote platform 1210 and/or 1220. The code can also specify a predetermined file number that is associated with an interface type such as a controller requesting a number 1 interface, a handheld device selecting a number 2 interface, and a remote workstation selecting a number N interface, N being an integer. The interface options 1240-1248 can include a display size, number and type of inputs displayed, number of outputs displayed, colors employed, shapes employed, icons, other devices that can access the interface 1200, programming options, user type and other options such as displayed file types.

In another aspect, the interfaces 1230-1238 and associated options 1240-1248 are user or administrator selectable. This could include providing a local selection menu at the local platform 1210 and/or providing selection options from the remote platform at 1220 such as from a web page. A user or administrator can select from a predetermined list of interface options, or alternatively answer questions or follow an interface/configuration wizard to indicate available resources of the platform. Upon indicating the available resources, the interface component 1200 can transmit an interface type 1230-1238 and associated options 1240-1248, if necessary, that are suited to the resources specified by the user.

Figure 13:
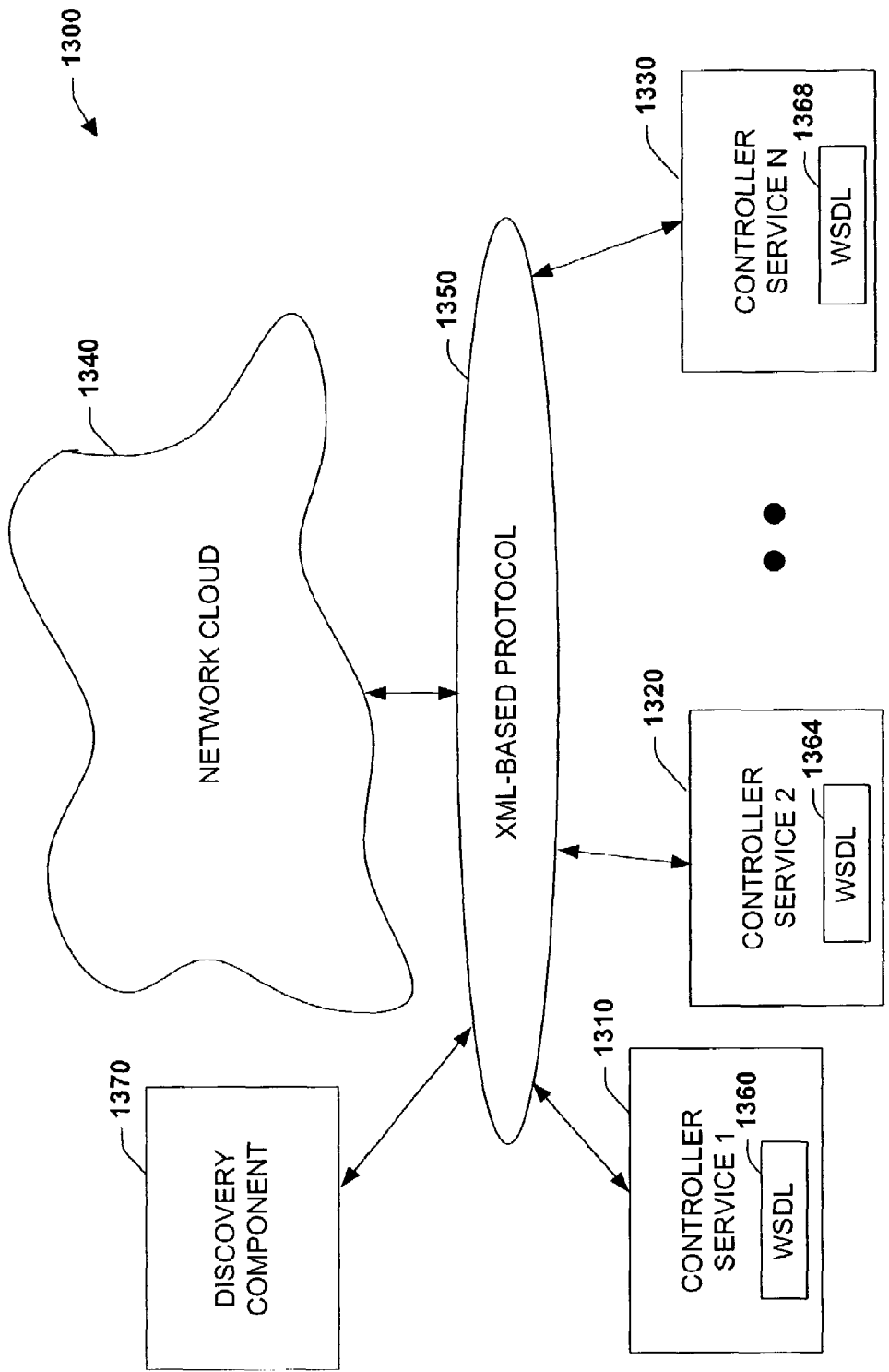
FIG. 13 is a schematic block diagram illustrating a web services architecture in accordance with an aspect of the present invention.

Before proceeding to a discussion of possible adaptable interfaces that can be provided or augmented from a remote web service, FIG. 13 illustrates a web architecture 1300 that can be employed in accordance with the adaptive interfaces of the present invention.

Referring to FIG. 13, a system 1300 illustrates web interface and protocols in accordance with an aspect of the present invention. A plurality of controller services 1310 through 1330 interact with a network cloud 1340 via an XML-based protocol 1350, wherein the network cloud can be served by a plurality of network servers or controllers operating as servers (not shown). In general, the protocol 1350 should be an open standard defined for use on a public communications systems such as the Internet. In one aspect, a Simple Object Access Protocol (SOAP) 1350 can be employed as a communications protocol for XML Web services. SOAP is an open specification that defines an XML format for messages between services. The specification can include describing how to represent program data as XML and how to utilize SOAP to perform Remote Procedure Calls. These optional parts of the specification are employed to implement Remote Procedure Call (RPC)-style applications, wherein a SOAP message containing a callable function, and the parameters to pass to the function, is sent from a client such as a control system, and the server returns a message with the results of the executed function. Most current implementations of SOAP support RPC applications since programmers who are familiar to COM or CORBA applications understand the RPC style. SOAP also supports document style applications whereby the SOAP message is provided as a wrapper around an XML document. Document-style SOAP applications are very flexible, wherein a control system XML Web service can take advantage of this flexibility to build controller services that may be difficult to implement with RPC.

Other parts of the SOAP specification define what an HTTP message that contains a SOAP message may appear as. HTTP binding can be important because HTTP is supported by almost all current operating systems. HTTP binding is optional, but almost all SOAP implementations support it as one possible standardized protocol for SOAP. For this reason, there's a common misconception that SOAP requires HTTP. Some implementations support MSMQ, MQ Series, SMTP, or TCP/IP transports, but almost all current XML Web services employ HTTP because it is ubiquitous. Since HTTP is a core protocol of the Web, most organizations have a network infrastructure that supports HTTP. Security, monitoring, and load-balancing infrastructure for HTTP are also readily available. It is to be appreciated that commercially available tools can be employed to construct SOAP messages directly. This can include a SOAP toolkit to create and parse SOAP messages. These toolkits generally translate function calls from a computer language to a SOAP message. For example, a Microsoft SOAP Toolkit 2.0 translates COM function calls to SOAP and an Apache Toolkit translates JAVA function calls to SOAP.

The controller services 1310 through 1330 can also employ an open interface standard such as a Web Service Description Language (WSDL) illustrated at 1360 through 1368 in order to provide interactions with the controller services and remote user interface aspects of the present invention. In general, a WSDL file or interface is an XML document that describes a set of SOAP messages and how the messages are exchanged. In other words, WSDL 1360-1368 is to SOAP what Interface Description Language (IDL) is to CORBA or COM. Since WSDL is in XML format, it is readable and editable but in most cases, it is generated and consumed by software. WSDL specifies what a request message contains and how the response message will be formatted in unambiguous notation. As an example, an I/O service can specify how inputs are to be requested from the service and how outputs can be sent to the service in the form of a response. In another aspect, inputs can be requested from an input service, wherein the response is a confirmation that the inputs were received. Outputs can be sent to an output service in the form of a request, wherein the response from the service is that the outputs were received. The user interfaces previously described can thus receive inputs from and/or send outputs to a respective web service in order to operate the adaptive portions of the interface.

The notation that a WSDL file utilizes to describe message formats is based on an XML Schema standard which implies it is both programming-language neutral and standards-based which makes it suitable for describing XML Web services interfaces that are accessible from a wide variety of platforms and programming languages. In addition to describing message contents, WSDL defines where the service is available and what communications protocol is employed to communicate to the service. This implies that a given WSDL file defines substantially all matters required to write a program to work with an XML Web service. As noted above, there are several tools available to read a WSDL file and generate code to communicate with an XML Web service. For example, some of the most capable of these tools are in Microsoft Visual Studio®.NET.

The system 1300 can also include a discovery component 11370, wherein the controller services 1310-1330 can be published and determined. In one aspect, a Universal Discovery Description and Integration (UDDI) can be provided at 1370 that serves as a type of logical "phone" directory (e.g., "yellow pages," "white pages," "green pages") describing Web services. A UDDI directory entry is an XML file that describes a controller system and the services it offers. There are generally three parts to an entry in the UDDI directory. The "white pages" describe the component offering the service: name, address, and so forth. The "yellow pages" include industrial categories based on standard taxonomies such as the North American Industry Classification System and Standard Industrial Classifications. The "green pages" describe the interface to the service in enough detail for users to write an application to employ the Web service. The manner services are defined is through a UDDI document called a Type Model or tModel. In many cases, the tModel contains a WSDL file that describes a SOAP interface to an XML Web service, but the tModel is generally flexible enough to describe almost any kind of service. The UDDI directory also includes several options to search for the services to build remote applications. For example, searches can be performed for providers of a service in a specified geographic location or for an entity of a specified type. The UDDI directory can then supply information, contacts, links, and technical data to enable determinations of which services to employ in a control process or interface type.

Figure 14:
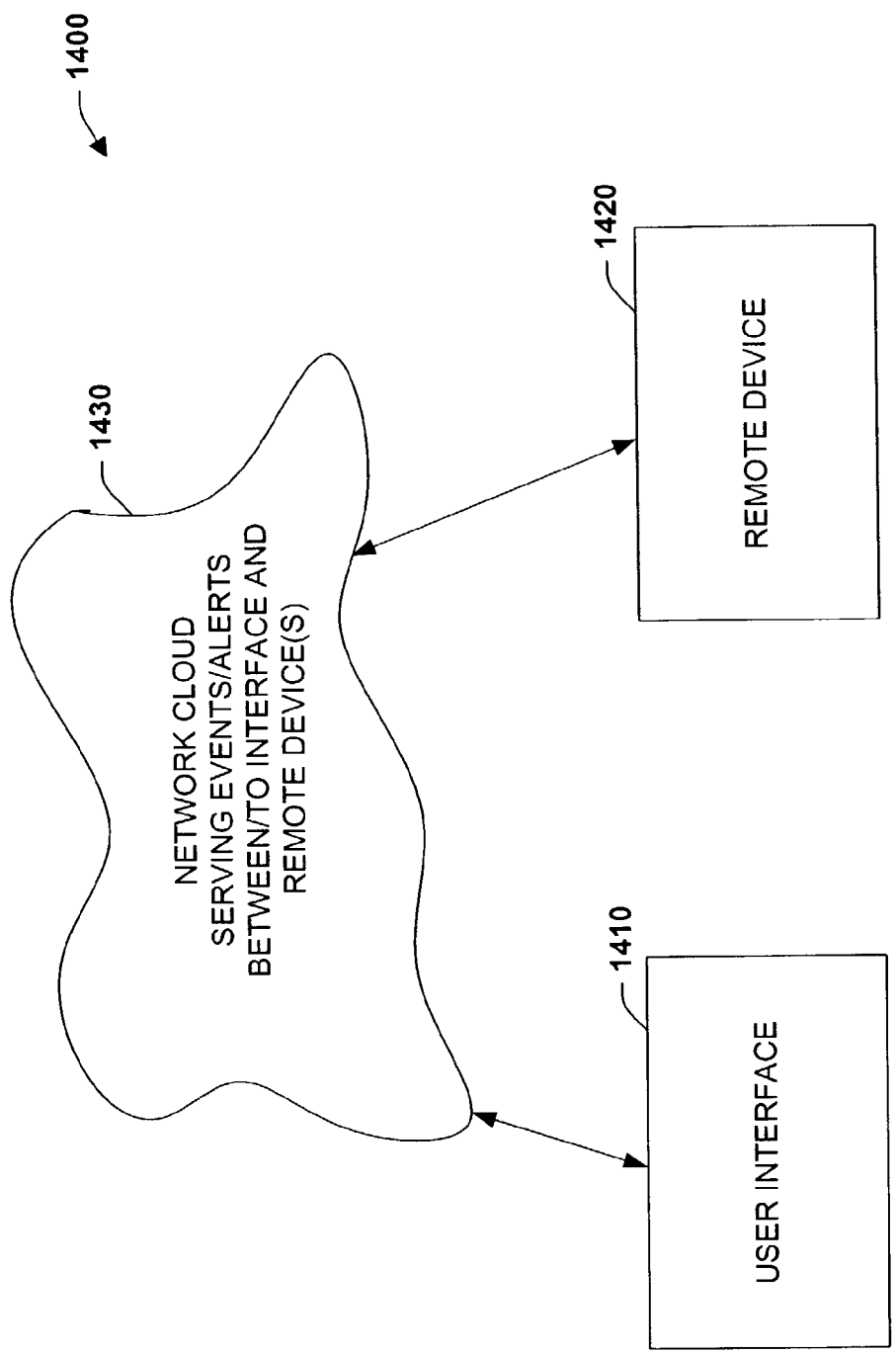
FIG. 14 is a schematic block diagram illustrating an alerting and event notification service and interface in accordance with an aspect of the present invention.

Referring now to FIG. 14, a system 1400 illustrates a user interface 1410 and remote device 1420 interacting with an event or alerting service provided by a cloud 1430 (e.g., .NET, CE.NET compatible web service supplied from one or more remote servers). In one aspect of the present invention, the user interface 1410 is adapted to communicate with a remote web service such as a .NET alerting service via the cloud 1430. For example, a commercially available web service (e.g., Microsoft®.NET Alerts) can be monitored by the user interface 1410 to receive messages or event notifications from the service. The messages can be from other users or remote devices 1420 indicating status or potential problems within a control system. Other type alerts can be generated from the cloud 1430 such as virus alerts or alerts indicating that new software packages are available. When alerts or message events are received, the user interface 1410 can display this information to an operator, and/or configure a subsequent automated event such as generating an e-mail or instant message with details of the event provided to the remote devices 1420.

Figure 15:
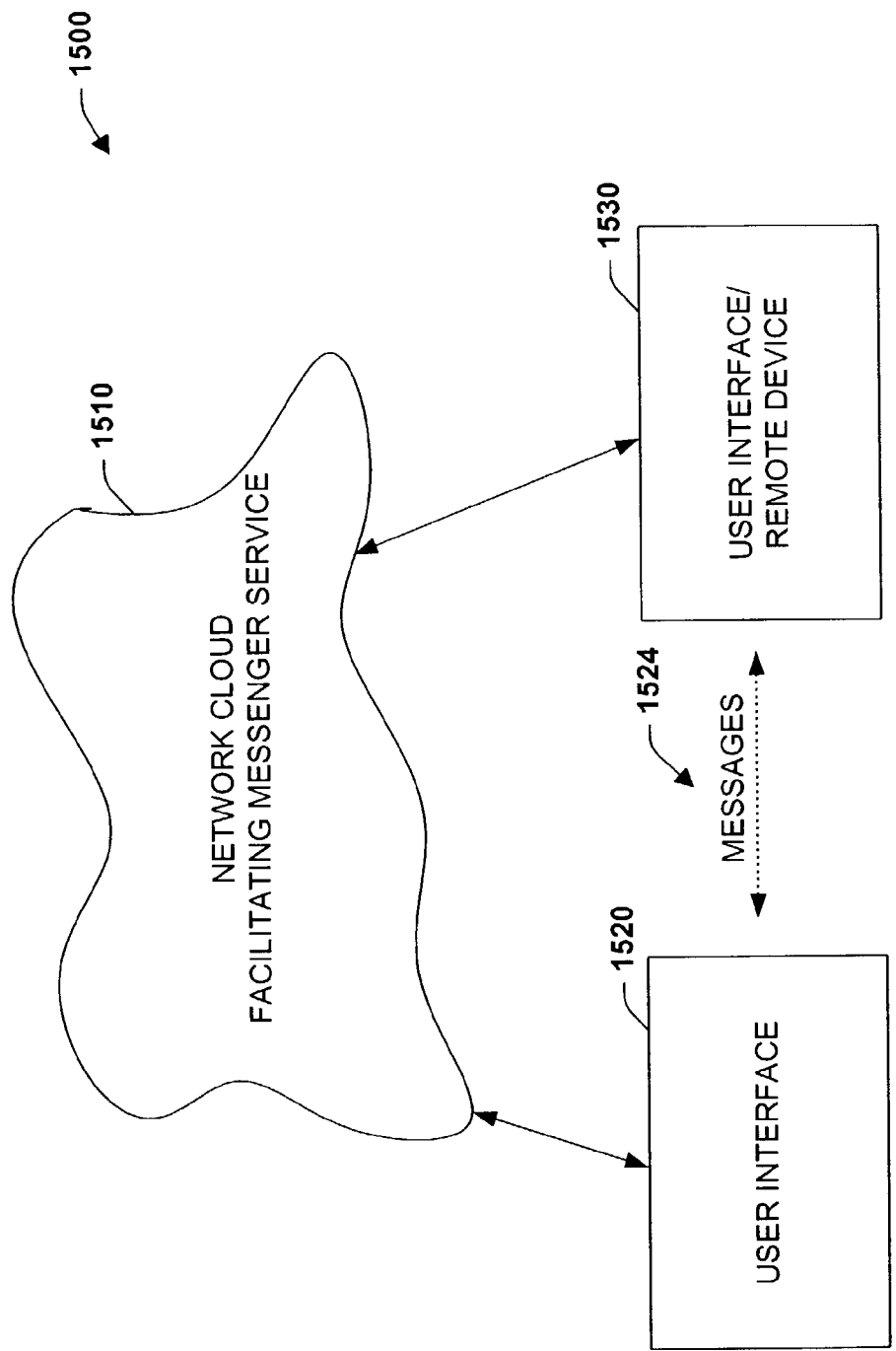
FIG. 15 is a schematic block diagram illustrating a messenger service and interface in accordance with an aspect of the present invention.

Referring to FIG. 15, a messenger service and user interface 1500 is illustrated in accordance with an aspect of the present invention. A network cloud 1510 which is served by one or more remote servers (not shown) provides a messenger service that can be adapted and employed with a user interface 1520. The user interface 1524 employs the messenger service to transmit/receive messages 1524 to/from other user interfaces and/or remote systems 1530 adapted to interact with the messenger service. Messenger services can be operated with commercially available message services that are offered as remote web services. These services offer in many cases substantially real time communications across public networks such as the Internet. For example, the messenger service can transmit messages 1524 between the platforms 1520 and 1530 in a much more rapid manner than such services as an e-mail service that is typically routed in a circuitous and sometimes unpredictable manner. In another aspect, the generated messages can be configured and/or adapted to be routed to a user and/or to a device (e.g., pager, cell phone, PDA, computer, industrial terminal, another controller, I/O device, communications device, and so forth).

FIG. 16 is a flow diagram illustrating a methodology 1600 providing an adaptive interface in accordance with the present invention. Proceeding to 1610, user interfaces are adapted to interact with various platforms. This can include web service interactions, remote device interactions such as with as controller, an I/O device, a communications module, and/or a wearable device for interacting with a control system that is described in more detail below. At 1620, interface capabilities are adapted to device capabilities and/or user preferences. This can include testing or sampling remote device resources and serving an interface to the device and/or computer operating the device that is automatically selected for the capabilities of the device. A plurality of interfaces can be stored and served in accordance with device capabilities such as memory size, display size/type, input capabilities, output capabilities, and/or other interface considerations. Web pages and or local interface pages can be served to enable users or administrators to select from a plurality of interface options. As an example, one type of interface may be selected for a handheld device, a different interface selected for a wireless device, still yet another interface selected for a small PLC (SLC), and still yet another interface type selected for a PLC. As can be appreciated, a plurality of such selections can be provided in accordance with various device capabilities.

At 1630 multiple communications protocols can be employed to communicate with the interface (e.g., Modbus/TCP, TCP/IP, FOUNDATION Fieldbus HSE, EtherNet/IP). This can also include formatting data based upon device capabilities, translating data received from the remote device to a protocol employed by the controller or PLC, and translating between proprietary protocols such as Control and Information Protocols (CIP), DeviceNet, ControlNet, to an open form such as an XML schema via an interface object adapted to perform such translations. At 1640, a plurality of configuration options can be provided with the user interfaces provided in 1610 through 1630. This can include display configuration options, input device selections, program selections, protocol selections, PLC selections, remote device selections, and include such aspects as icon selections, color selections, alerting options (e.g., e-mail or message address where to send message), message options (e.g., messenger service, e-mail service, pager numbers) and other options.

Referring to FIG. 17, a user interface system and process 1700 is illustrated in accordance with the present invention. The system 1700 includes a user interface 1710 to interact with one or more remote systems (not shown). At 1720, aspects of a user are determined. This can include applying artificial intelligence techniques and/or probability analysis to infer a context (e.g., what is user doing, how busy is the user, how focused is the user, what are the user's goals) for the user and/or determine one or more characteristics of the user. This can include monitoring sound and/or video inputs of the user at 1710, monitoring microphone or mouse/keyboard activities to determine a user state such as present context. When the capabilities of the user have been determined, an interface can be automatically provided at 1730 that relates to the capabilities determined at 1720.

In accordance with one aspect of the present invention, the user interface 1710 monitors/determines overall user attributes or capabilities at 1720 and selects, alters, adjusts, and/or tunes an associated interface at 1730 according to the determined capabilities or attributes. As one example, attributes may include where a user is currently located, what device is accessible by the user, time access is requested, capabilities of the device, and so forth. As another example, this can include rules-based determinations (e.g., if the user appears to be searching a program for problems provide troubleshooting interface, if user appears to be adding new code, provide programming interface), algorithmic determinations, and/or other determinations such as statistical analysis, probabilistic analysis, and/or higher-level inference analysis that may be applied in accordance with artificial intelligence or other techniques which are described in more detail below.

Based on an analysis of user capabilities and/or attributes, the user interface 1710 performs a plurality of various actions to cause changes in the interface provided to the user, interface operations, performance, and/or configuration. It is to be appreciated that changes can also occur based upon regularly scheduled events such as routine conditions (e.g., flag fired from a timer or a calendar) and/or in accordance with predetermined time intervals (e.g., in the morning, provide operations interface).

Artificial intelligence techniques can be provided to effect interface decisions (e.g., what interface to display based on determined user capabilities) including such techniques as Bayesian analysis and belief networks. This type analysis can be employed to determine such aspects as interface type selected and interface or configuration options provided to the user. Other analysis aspects can include transforming data between protocols such as XML and local controller protocols to facilitate more efficient processing of data acquired from multiple sources. For example, a plurality of XML files, schemas or blobs may be received from remote systems describing various resources. Although the XML data can be processed in its present form, it may be more efficient to transform all or portions of the data to a different form such as a binary file, HEX file, a structure, an array, and/or other form before processing begins. This can include applying higher level language functions (e.g., convert ASCII to binary ( ), define structure, format array) that are commonly available in compiled code such as object languages, C and C++, for example. This can also include instruction sequences that input a known code type (e.g., XML), and maps the code type to one or more other code types in accordance with the mapping (e.g., characters such as 20 followed by % maps ASCII 20 into binary 20 followed by multiplication of 0.01).

In accordance with one aspect of the present invention, interface types can be determined in a regular manner according to a regular query of resources initiated by the user such as mouse and keyboard activities. For example, inputs, data, a sequence of data, a variance of data and/or patterns of data or inputs received by the user interface 1710 can be monitored for possible trends or inferences derived from the data. This can include statistical or probability analysis to determine possible user characteristics.

In another aspect of the present invention, user patterns (e.g., patterns of interface activities) can be stated as a general probabilistic estimate to determine a performance condition given monitored evidence of an input pattern or occurrence. The estimate can be stated as:

EXAMPLE 1

$$Pr(Chp|E_1, E_2, \ldots E_J);$$

wherein Pr is a probability, Chp relates to a character determinations given evidence E relating to determining user activities and context, and J being an integer. This can also include evidence of consistency with a previous user patterns to predict likely future outcomes or performance conditions. It is noted that probability models can be constructed from typical controller or system operations. This can include monitoring user resources for typical variances and monitoring such aspects as how often particular events occur (e.g., how often does this user access keyboard). Classification models can be constructed that learn routine behaviors or user patterns in order to generate probabilities that predict possible future user patterns. For example, such techniques can include Support Vector Machines (SVM), Naive Bayes, Bayes Net, decision tree, similarity-based, vector-based, and/or other learning models or combinations thereof. Classifiers can be stated as a function that maps an input attribute to the confidence that the input belongs to a class. In the case of recognizing human characteristics to determine user states, attributes can be typical data subsets or values sampled over the course of time (e.g., user activities monitored from a plurality of systems/inputs at predetermined intervals) and/or include other pattern-specific attributes derived from the data subsets.

Figure 18:
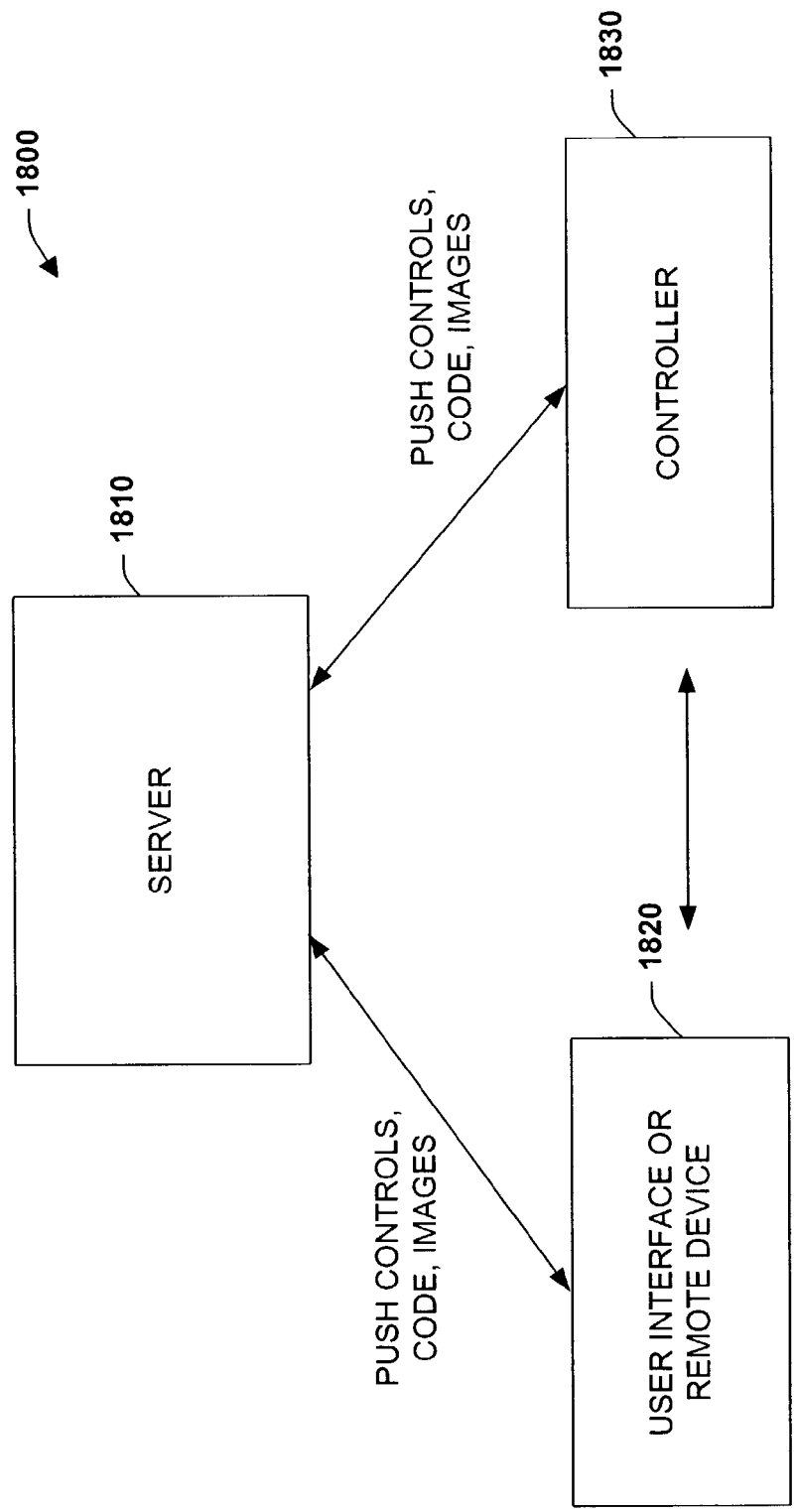
FIG. 18 is a schematic block diagram illustrating a push system and interface in accordance with an aspect of the present invention.

Referring now to FIG. 18, a push system 1800 is illustrated in accordance with the present invention. The system 1800 includes a remote server 1810 that can push (e.g., download) a plurality of features from the server to a user interface 1820 (or remote device) and controller 1830. The user interface 1820 can then employ the pushed features when interacting with the controller 1830. For example, the server can push images such as a JPEG, TIFF, GIFF, Bit map, and/or other type image to the user interface 1820 and/or controller 1830 to facilitate interface displays and/or controller operations. Other loadable aspects include pushing code such as an executable, pushing rich content to enhance interface activities, and can include employing a web page/interface page as a facilitator to access a particular code type on an as needed basis. This can include providing access to controls such as Active X controls, Distributed Component Object Model Interfaces (DCOM), WSDL Interfaces, SOAP message descriptions, and/or other controls such as JAVA or CORBA controls.

Figure 19:
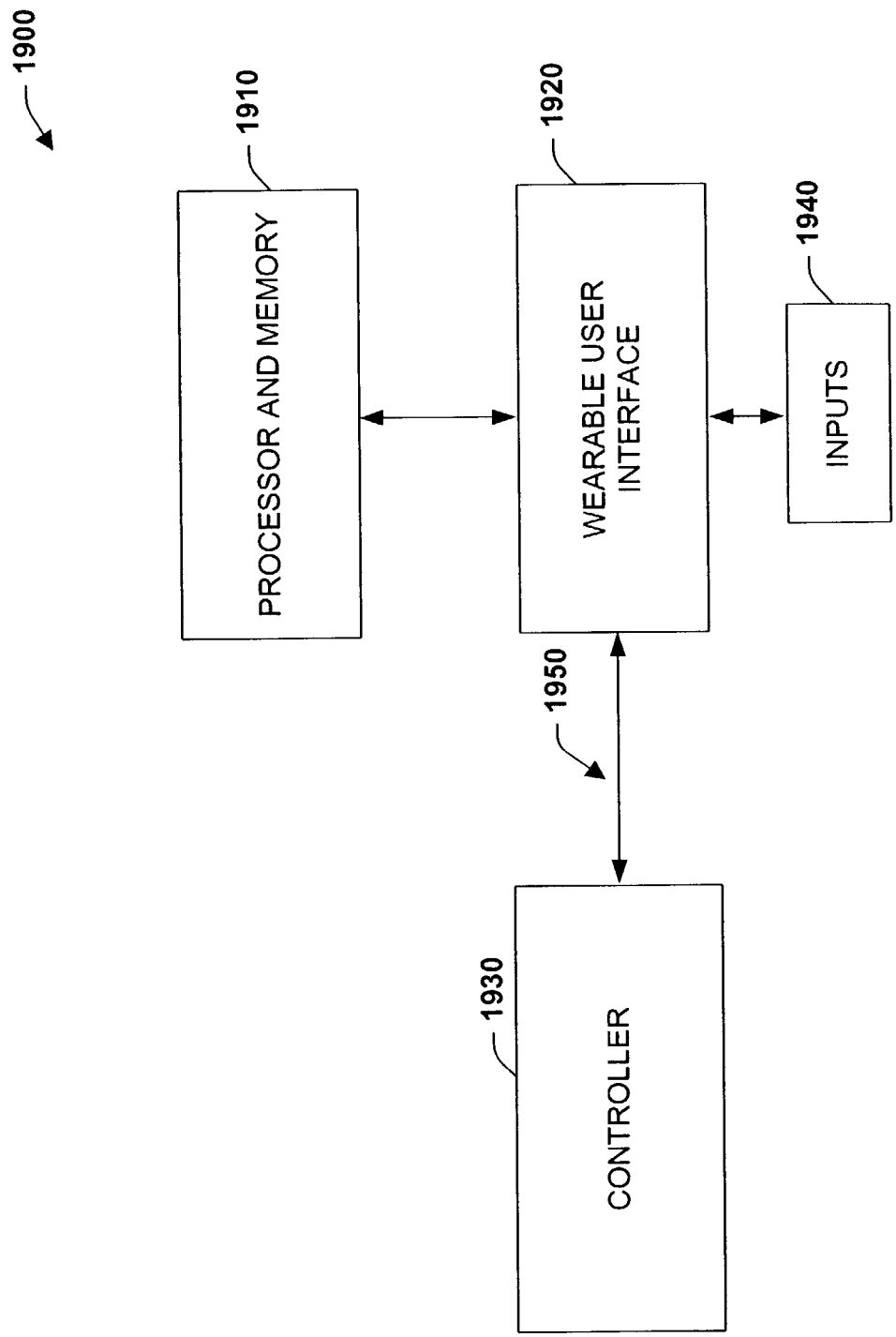
FIG. 19 is a schematic block diagram illustrating a wearable interface in accordance with an aspect of the present invention.

Referring now to FIG. 19, a wearable interface system 900 is illustrated in accordance with the present invention. A processor and associated memory component 1910 drives a wearable interface 1920 that interfaces to a controller or other remote device 1930. The wearable interface 1920 can include substantially any type of device that is adapted to a user's body. This can include glasses, goggles, hats, headgear, helmets and so forth. The processor and memory 1910 can be adapted to execute the wearable interface to enable the user to interact with the controller 1930. One or more inputs 1940 can be provided that facilitate interface operations. These inputs can include microphone inputs, hand held keyboard inputs, wireless inputs, and other type inputs, if desired. The wearable interface 1920 can also provide display capabilities such as displaying a small interface window in one or both panes of a set of glasses or goggles. Even though the interface display in reality may only be a few square centimeters or less, it may appear as normal size being that the interface is worn near the user's eye and thus, provides a perspective about that of a standard desktop type display. Moreover, the wearable device may provide a plurality of connection options to the controller 1930 via transmission line or frequency at 1950. For example, hardwired connections can occur, network connections are possible, infrared (or other frequency), optical connections such as fiber optic, and/or wireless connections can occur between the interface and the controller. In addition, wireless aspects can include employment of Bluetooth protocol/interface standards capabilities when interacting between the wearable interface 1920 and the controller 1930. Other type communications can include RF/video transmissions, visible/non-visible spectrum modalities of transmitting data such as Wi-Fi 802.11a & .11B, an IrDa standard for infrared communications, and/or such technologies such as DSL, CableModem, and HomePNA (power line carrier/carrier-band data transfer).

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:
   an industrial controller comprising a first instant messenger installed thereon that facilitates communication between the industrial controller and a network; and
   a remote system of the industrial controller that is adapted to employ, at least a second instant messenger, the industrial controller establishes a real-time chat room session with the remote system based at least in part on an event including one of a detected fault and a diagnostic problem and notifies the remote system of a pending problem or other status via instant messages, and the remote system modifies at least one industrial operation via the industrial controller according to decision taken by multiple users in collaboration during the real time chat room session between the first and second instant messengers.

2. The system of claim 1, the second instant messenger is operable on a hand-held device.

3. The system of claim 1, the event further comprising at least one of a status, and communication of data associated with the industrial controller.

4. The system of claim 1, the remote system is at least one of a computer, a work station, a laptop, a hand held device, a cell phone, a pager and a personal digital assistant.

5. The system of claim 1, the second instant messenger is a web service providing multi-entity communications capabilities.

6. The system of claim 1, the industrial controller notifies an operator of a pending problem or other status via messages or codes provided in the communications session.

7. The system of claim 1, the communications session is at least one of bi-directional and multi-directional if other parties or devices are involved, the communications session facilitates at least one of access to industrial controller information, perform further diagnosis, send commands, and initiate further procedures.

8. The system of claim 1, the communications session is established in order to observe current operating status or other controller activities.

9. The system of claim 1, the network includes at least one of a local factory network, a public network including the Internet, an Intranet, a phone network, and a wireless network.

10. The system of claim 1, further comprising an operating system in the industrial controller, the operating system including at least one of Windows® NT/2000/XP, Windows CE, Linux, .NET, OS-9, UNIX, VRTX, QNX, VxWorks, CE.NET, custom-designed.

11. The system of claim 1, the industrial controller further comprises at least one of an Input/Output module (I/O), a communications module, a network module, a programmed module, an intelligent module, software modules, web services, and a programmable logic controller (PLC).

12. The system of claim 11, the I/O module participates in a communications session through at least one of the PLC and the communications module.

13. The system of claim 1, further comprising at least one network server to facilitate communications between the instant messengers.

14. The system of claim 1, further comprising an interface dialog that is provided to exchange information between one or more parties of a communications session, the parties including at least one of a user, a remote system, and the industrial controller.

15. The system of claim 14, the information includes at least one of automated information driven from at least one of systems and industrial controller.

16. The system of claim 14, the information includes at least one of type-written messages, voice encoded messages, diagrams, video data, pictures, sounds, symbols, icons, emoticons, reports, files, procedures, manuals, hypertext links, web information, factory information, status data, control data, configuration data, mathematical data, and program data.

17. The system of claim 14, the communications session is established based in part on at least one of a remote system initiation, a user-driven initiation, an industrial controller initiation, an event initiation, a maintenance initiation, and a status initiation.

18. The system of claim 1, further comprising an XML schema to exchange the data, the schema including at least one of a diagnostic schema, a status schema, and an update schema.

19. The system of claim 1, the network communications further comprising at least one of Bluetooth, RF transmissions, video transmissions, visible and non-visible spectrum modalities of transmitting data, an IrDa standard for infrared communications, DSL, CableModem, power line carrier, and carrier-band data transfer.

20. The system of claim 1, the instant messengers are adapted with a Web Services Description Language (WSDL) that describes how to interact with a web service.

21. The system of claim 20, the web service is at least one of a .NET service, an alerting service, an event service, and a messenger service.

22. The system of claim 20, further comprising a Simple Object Access Protocol (SOAP) to communicate with the web service.

23. The system of claim 20, further comprising a discovery component to facilitate locating the web service and determining web service functionality.

24. The system of claim 1, wherein the second instant messenger is installed on the remote system.

25. The system of claim 1, wherein the industrial controller notifies a plurality of remote systems of the pending problem or other status via instant messages and establishes a real-time chat room session with the plurality of the remote systems.

26. A method to facilitate real time communications in an industrial controller environment, comprising:
    installing a web messenger service on an industrial controller;
    establishing communications with the web messenger service; and
    adapting an interface dialog with the web messenger service to facilitate substantially real time communications between the industrial controller and a remote system of the industrial controller based on an instant message sent from the industrial controller to the remote system, regarding at least one of a detected fault and diagnostic problem, the remote system modifies at least one process associated with the industrial controller in real time via the web messenger service in according to decision taken by multiple users in collaboration via the web messenger service.

27. The method of claim 26, further comprising adapting multiple communications protocols to operate with the web messenger service.

28. The method of claim 26, facilitating the real-time communications comprising establishing a chat session via the interface dialog.

29. The method of claim 28, further comprising automatically establishing the chat session further based upon at least one of, a maintenance activity, and a status check.

30. The method of claim 26, the industrial controller is at least one of a programmable logic controller, an I/O module, a communications module, and a software module.

31. A system to facilitate multi-party communications in an industrial controller environment, comprising:
    means for initiating event-driven real-time communications by an industrial controller via an instant messenger service installed on the industrial controller;
    means for solving a pending problem in collaboration by multiple users in a chat room session via the instant messenger service;
    means for interfacing to the instant messenger service; and
    means for facilitating remote control of an industrial process associated with the industrial controller in real time by at least one other entity in accordance with decision taken by multiple users via the instant messenger service.

32. The system of claim 31, further comprising means for exchanging information between the industrial controller and the at least one other entity.

33. The system of claim 31, the entity is at least one of a remote system of the industrial controller, a user, and another industrial controller.

34. A system for establishing a communications session associated with an industrial control system, comprising:
    at least one industrial controller comprising an interface to facilitates communication with an entity wherein the industrial controller establishes a chat room session with the entity to notify the entity of a pending problem or other status via an instant messenger service installed on the industrial controller;
    at least one network server to support the interface; and
    a chat room service associated with the interface to allow the entity to modify at least one industrial operation via the at least one industrial controller in accordance to a decision taken by multiple users in collaboration in the chat room session.

35. The system of claim 34, the entity is at least one of a remote system of the industrial controller, a user, and another industrial controller.

36. The system of claim 34, the chat room session is driven from at least one of an event, a time, a period, a calendar, a maintenance activity, a status activity, a diagnostic activity, and a troubleshooting activity.

37. The system of claim 34, the industrial controller at least one of reports an event type to the chat room service, contacts a system, contacts a user, transmits data to the chat room service in response to a query, and receives data from the chat room service.

38. The system of claim 34, further comprising at least one of:
    multiple users collaborating in the chat room service; and
    multiple industrial controllers exchanging data in the chat room service.

39. The system of claim 34, the chat room service is adapted with at least one of an RFC 1459 Internet Relay Chat Protocol, an RFC 2810 Internet Relay Chat: Architecture, an RFC 2811 Internet Relay Chat: Channel Management, an RFC 2812 Internet Relay Chat Client Protocol, and an RFC 2813 Internet Relay Chat: Server Protocol.

* * * * *